US009658673B2

(12) United States Patent
Nakai

(10) Patent No.: US 9,658,673 B2
(45) Date of Patent: May 23, 2017

(54) INFORMATION PROCESSING APPARATUS, CONTROL METHOD FOR REWRITING A SETTING VALUE FOR THE INFORMATION PROCESSING APPARATUS IN POWER SAVING MODE, AND STORAGE MEDIUM

(71) Applicant: CANON KABUSHIKI KAISHA, Tokyo (JP)

(72) Inventor: Hironobu Nakai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 14/724,285

(22) Filed: May 28, 2015

(65) Prior Publication Data

US 2015/0346802 A1 Dec. 3, 2015

(30) Foreign Application Priority Data

Jun. 2, 2014 (JP) .................................. 2014-114370

(51) Int. Cl.
  *G06F 1/00* (2006.01)
  *G06F 1/32* (2006.01)
  *G03G 15/00* (2006.01)

(52) U.S. Cl.
  CPC ....... *G06F 1/3206* (2013.01); *G03G 15/5004* (2013.01); *G03G 15/5079* (2013.01); *G06F 1/3209* (2013.01); *G06F 1/3287* (2013.01); *Y02B 60/1282* (2013.01)

(58) Field of Classification Search
  None
  See application file for complete search history.

(56) References Cited

U.S. PATENT DOCUMENTS

| 2004/0073824 | A1* | 4/2004 | Machida | G06F 1/3228 713/323 |
| 2007/0183786 | A1* | 8/2007 | Hinosugi | H04B 10/40 398/140 |
| 2009/0040541 | A1* | 2/2009 | Maeda | B41J 3/407 358/1.9 |
| 2011/0179257 | A1 | 7/2011 | Shinoda | 712/220 |
| 2011/0185208 | A1* | 7/2011 | Iwamoto | G06F 1/3203 713/323 |
| 2015/0153808 | A1 | 6/2015 | Nakai | 358/1.14 |

FOREIGN PATENT DOCUMENTS

JP         2011-150407 A         8/2011

* cited by examiner

*Primary Examiner* — Nitin Patel
(74) *Attorney, Agent, or Firm* — Fitzpatrick, Cella, Harper & Scinto

(57) ABSTRACT

An information processing apparatus comprises: a receiving unit that receives data; a determination unit that, if the received data is setting value change data used for changing a setting value, determines whether or not the setting value needs to be immediately changed based on the setting value change data; and a control unit that, if the information processing apparatus operates in a sleep mode and it is determined that the setting value needs to be immediately changed, controls so that the information processing apparatus returns from the sleep mode and changes the setting value, and if the information processing apparatus operates in the sleep mode and it is determined that the setting value does not need to be immediately changed, controls so that the information processing apparatus does not immediately change the setting value and maintains the sleep mode.

13 Claims, 18 Drawing Sheets

FIG. 7
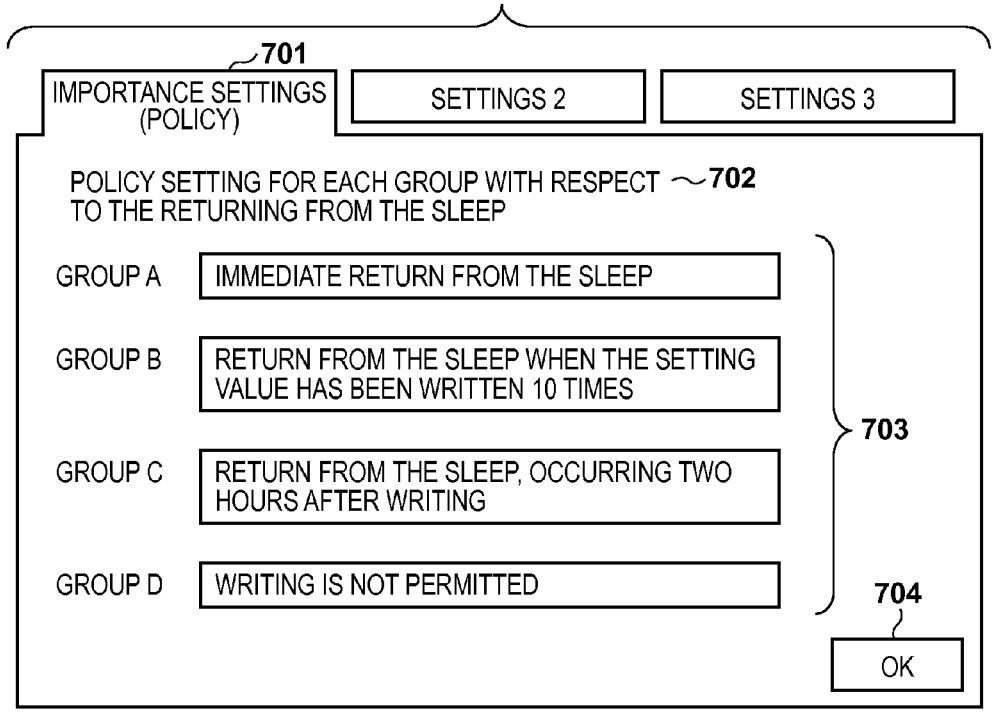
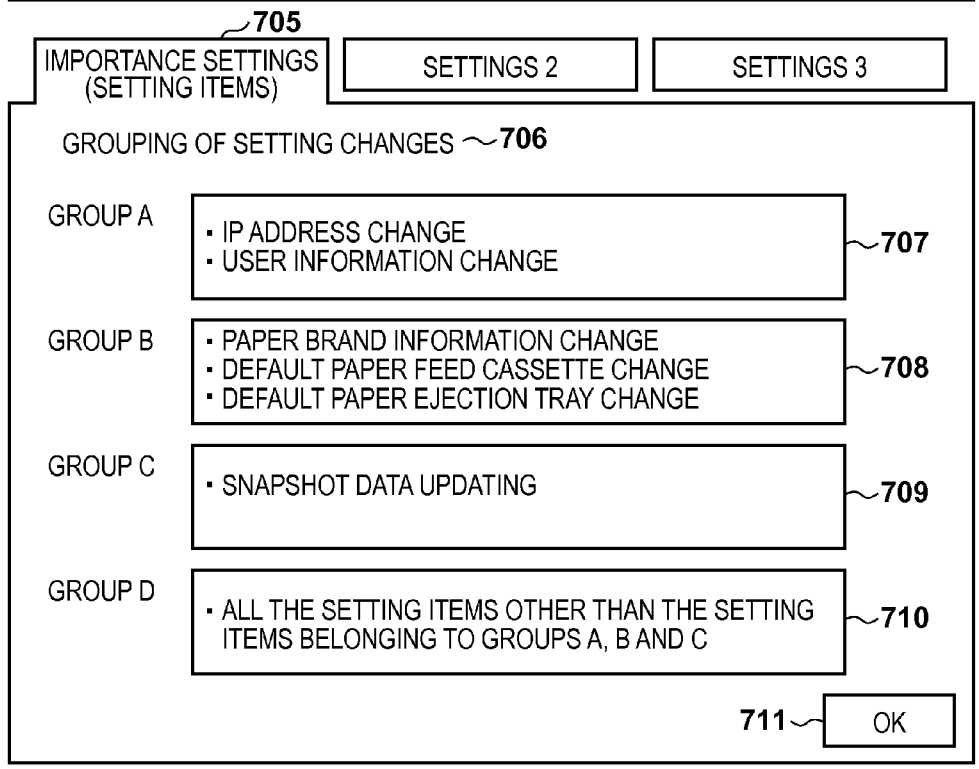

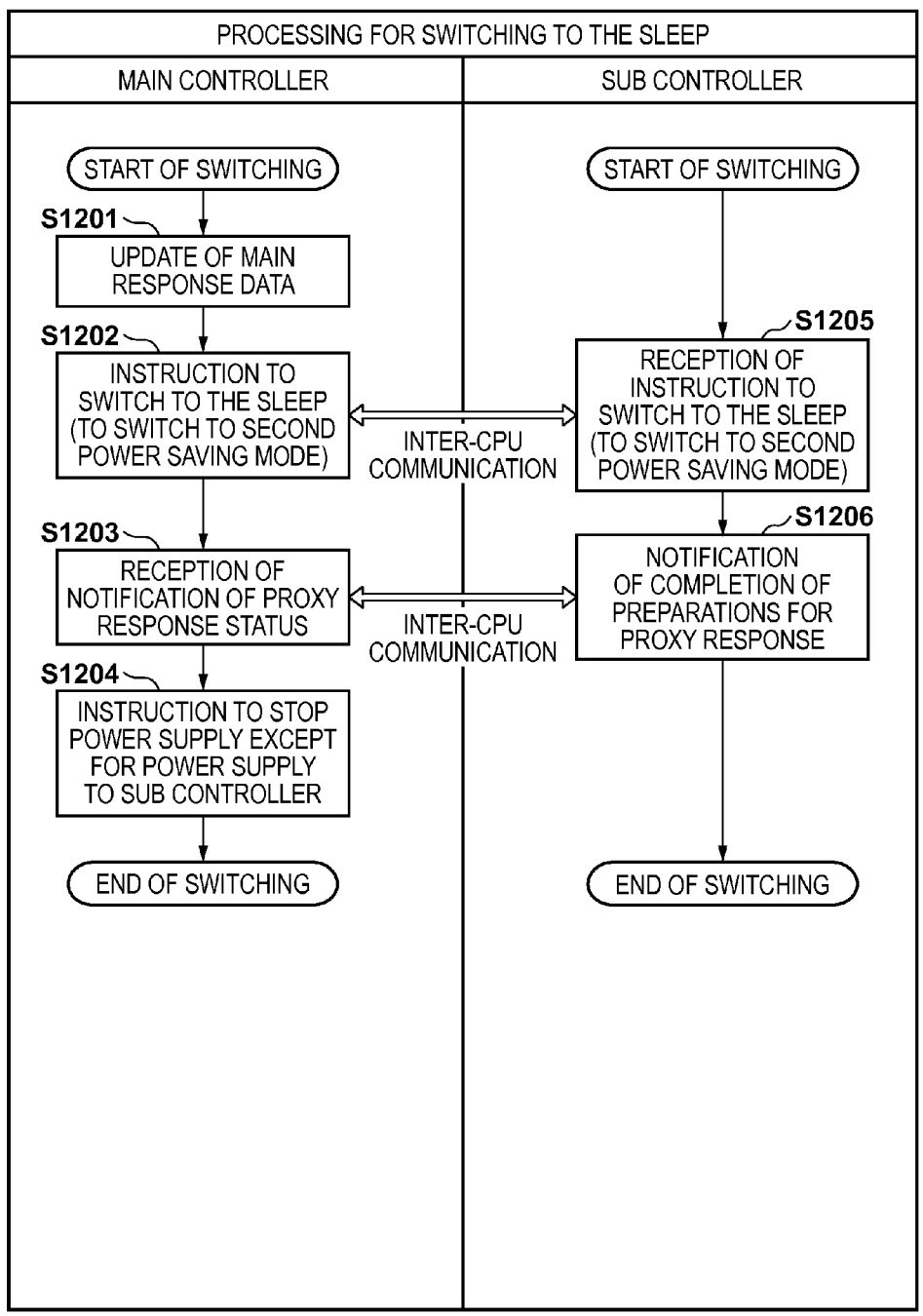
F I G. 12

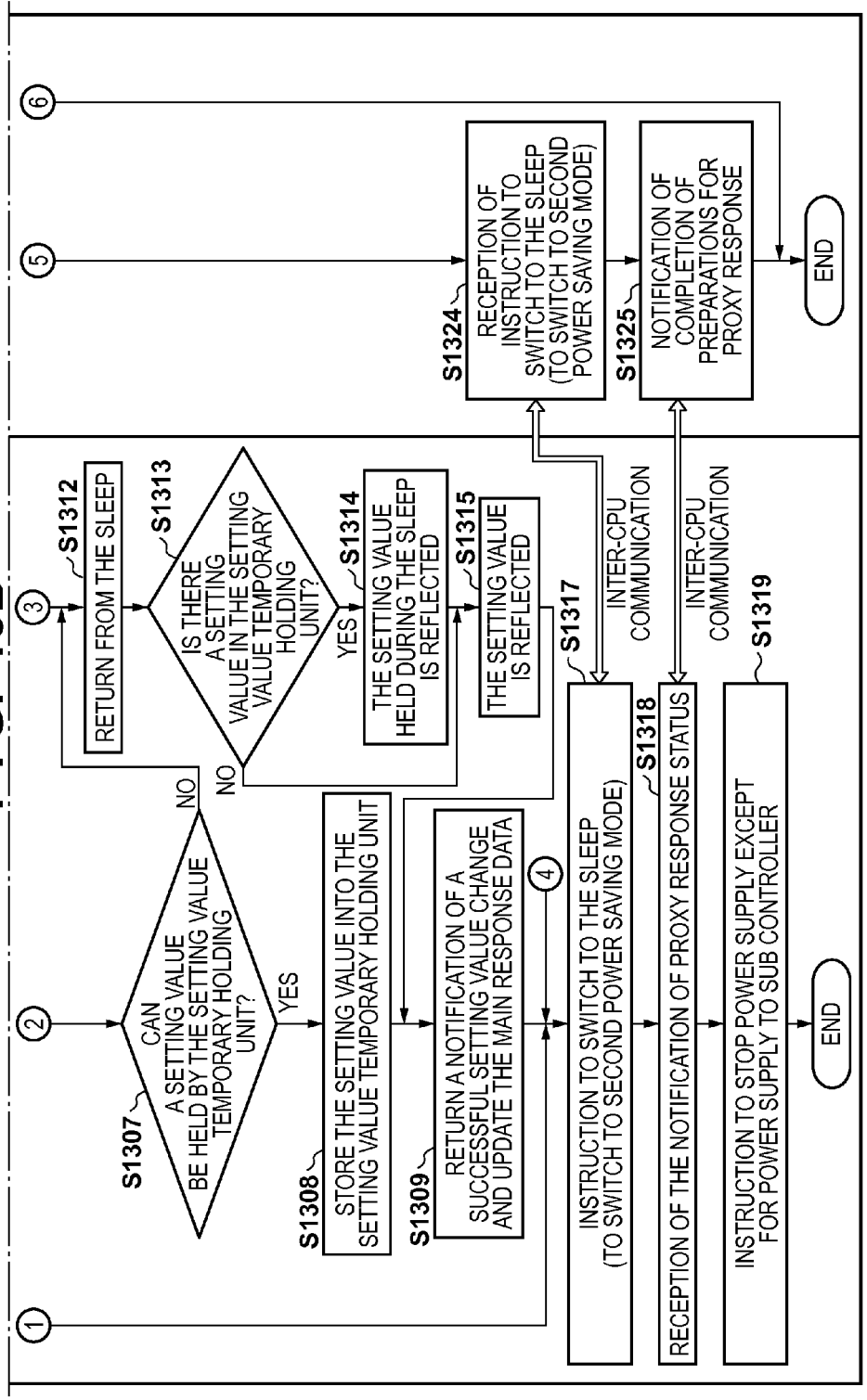

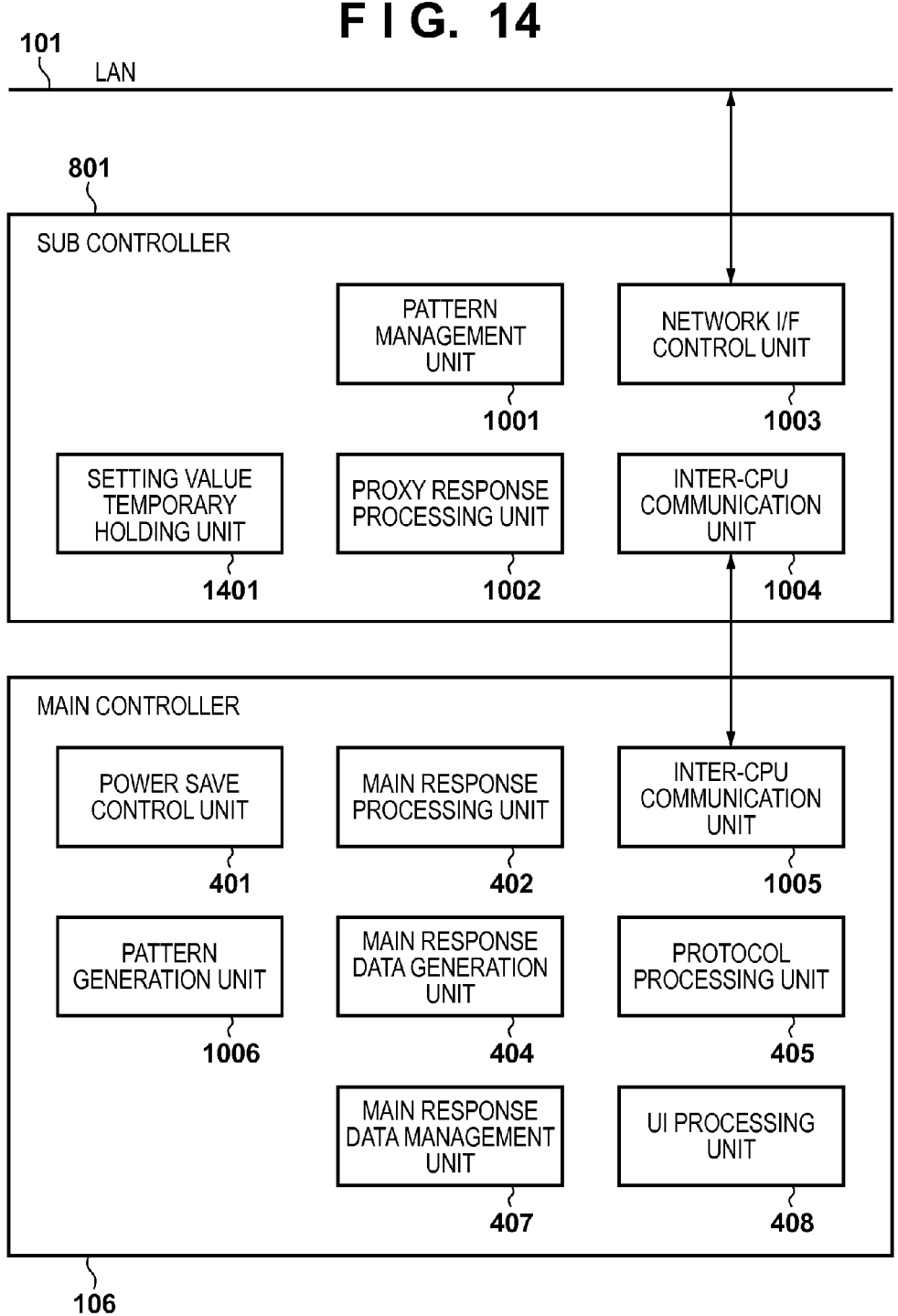

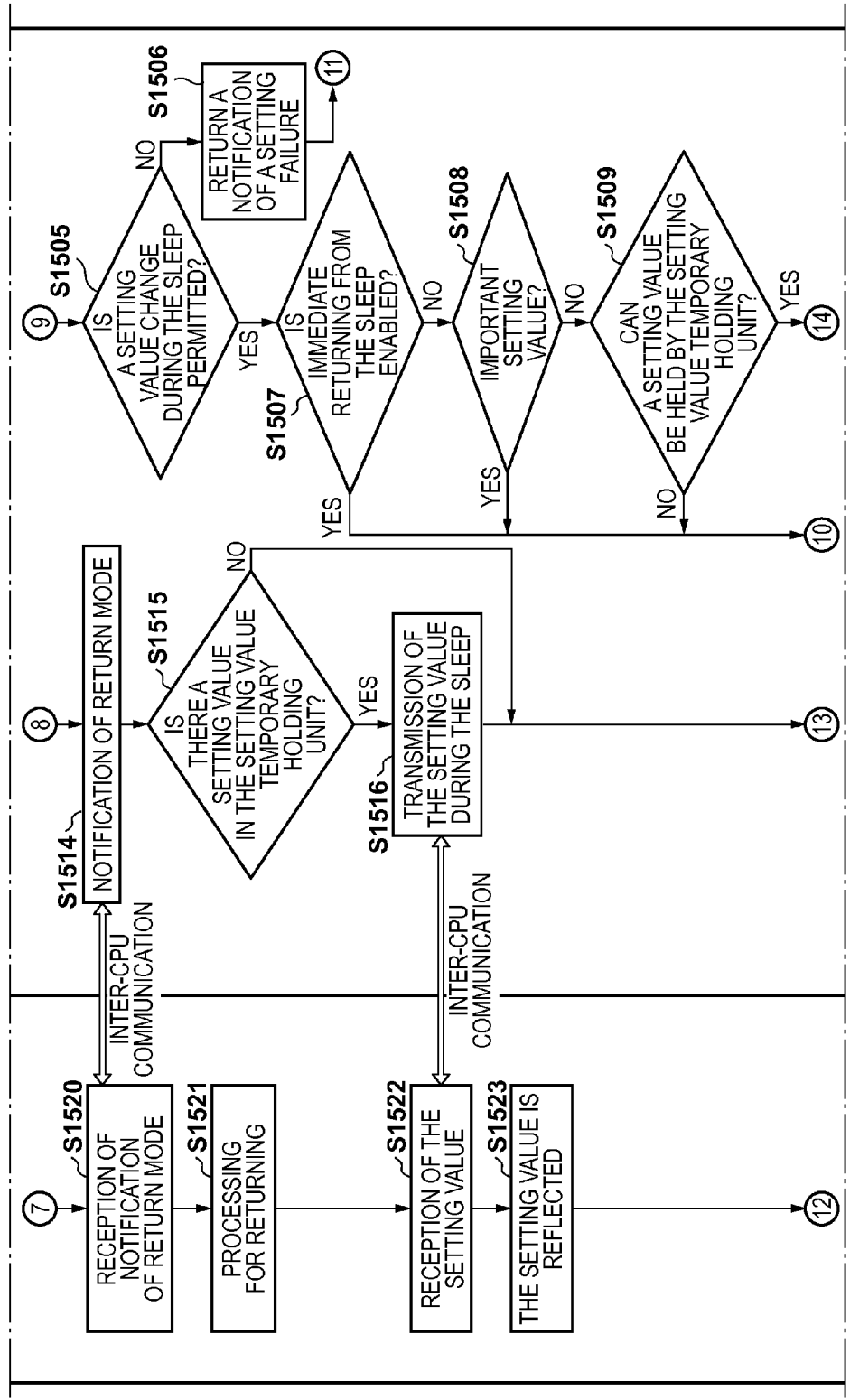

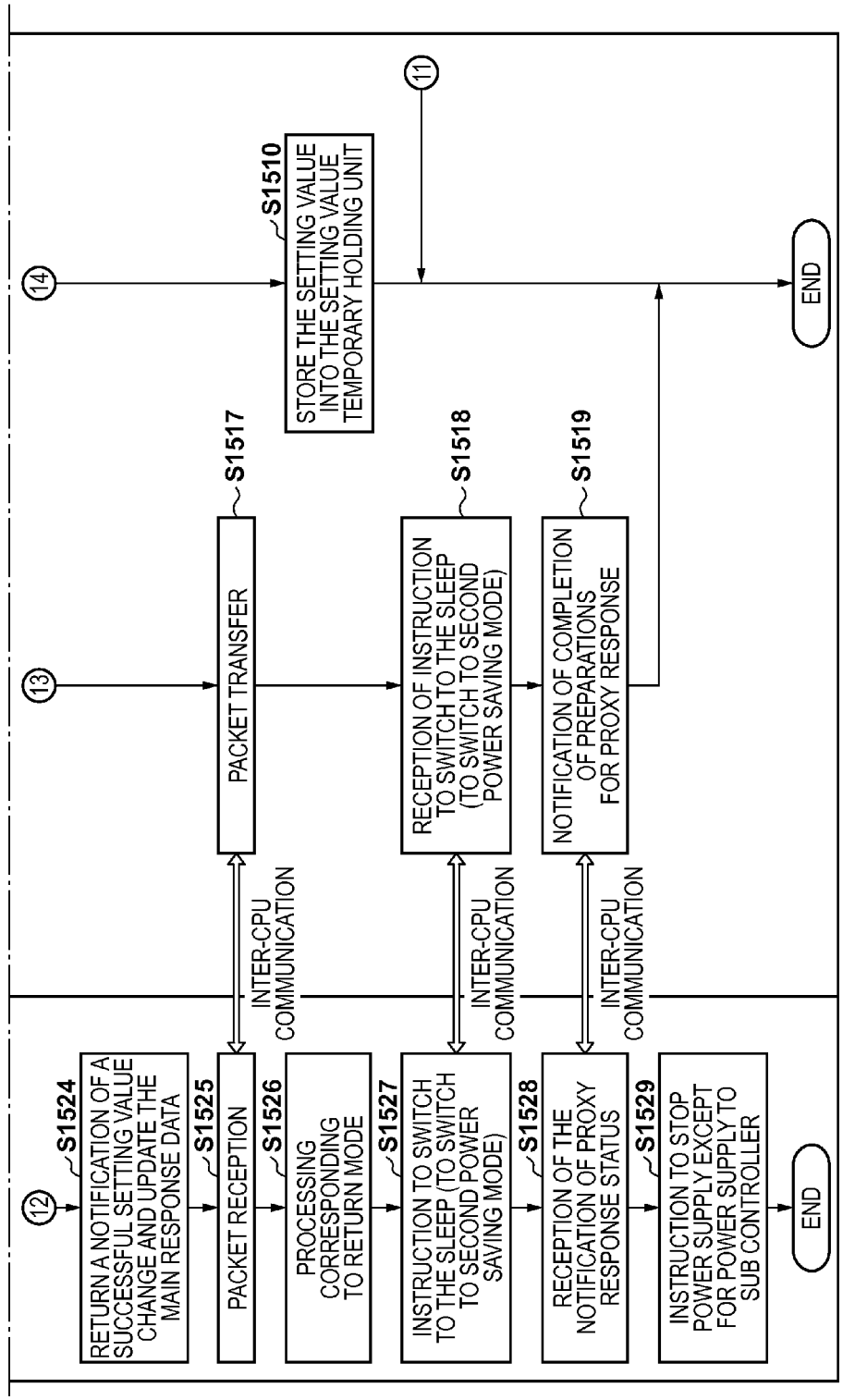

INFORMATION PROCESSING APPARATUS, CONTROL METHOD FOR REWRITING A SETTING VALUE FOR THE INFORMATION PROCESSING APPARATUS IN POWER SAVING MODE, AND STORAGE MEDIUM

BACKGROUND OF THE INVENTION

Field of the Invention

The present invention relates to an information processing apparatus, a method for controlling the same, and a non-transitory computer-readable medium, and in particular to control with respect to rewriting of a setting value for an image forming apparatus in a power saving mode.

Description of the Related Art

In recent years, there have been demand for low power consumption devices with the growing awareness of environment and energy issues. There is a known image forming apparatus that is capable of switching to a power saving mode when the apparatus has been remaining in the unused state for a predetermined period, in order to reduce the power consumption of the apparatus. Power saving mode is a mode in which standby power consumption is reduced by stopping some of the functions of the image forming apparatus, for example. As a power saving technology, Japanese Patent Laid-Open No. 2011-150407 discloses a configuration for determining whether to maintain the power saving mode or return to the normal power mode according to data received in the power saving mode. Japanese Patent Laid-Open No. 2011-150407 discloses that the image forming apparatus maintains the power saving mode when the data received by the image forming apparatus in the power saving mode is data for writing of a setting value, and returns from the power saving mode to the normal power mode when the data is for photocopy processing.

According to Japanese Patent Laid-Open No. 2011-150407, the power saving mode is maintained when the data is for writing of a setting value. Therefore, even in the case of rewriting of an important setting value (e.g., user ID and password information), the value cannot be immediately reflected. In addition, the written setting value might disappear before being reflected, due to an unexpected power shutdown or the like.

SUMMARY OF THE INVENTION

According to one aspect of the present invention, there is provided an information processing apparatus that is operable in a sleep mode, comprising: a receiving unit configured to receive data transmitted by an external apparatus; a first determination unit configured to, if the data received by the receiving unit is setting value change data used for changing a setting value of the information processing apparatus, determine whether or not the setting value needs to be immediately changed based on the setting value change data; and a control unit configured to, if the information processing apparatus operates in the sleep mode and the first determination unit determines that the setting value needs to be immediately changed, control the information processing apparatus so that the information processing apparatus returns from the sleep mode and changes the setting value, and if the information processing apparatus operates in the sleep mode and the first determination unit determines that the setting value does not need to be immediately changed, control the information processing apparatus so that the information processing apparatus does not immediately change the setting value and maintains the sleep mode.

According to another aspect of the present invention, there is provided a method for controlling an information processing apparatus that is operable in a sleep mode, the method comprising: a receiving step of receiving data transmitted by an external apparatus; a first determination step of, if the data received in the receiving step is setting value change data used for changing a setting value of the information processing apparatus, determining whether or not the setting value needs to be immediately changed based on the setting value change data; and a control step of, if the information processing apparatus operates in the sleep mode and a determination is made in the first determination step that the setting value needs to be immediately changed, controlling the information processing apparatus so that the information processing apparatus returns from the sleep mode and changes the setting value, and if the information processing apparatus operates in the sleep mode and a determination is made in the first determination step that the setting value does not need to be immediately changed, controlling the information processing apparatus so that the information processing apparatus does not immediately change the setting value and maintains the sleep mode.

According to another aspect of the present invention, there is provided a non-transitory computer-readable medium for enabling a computer to have functions of: a receiving unit configured to receive data transmitted by an external apparatus; a first determination unit configured to, if the data received by the receiving unit is setting value change data used for changing a setting value of the computer, determine whether or not the setting value needs to be immediately changed based on the setting value change data; and a control unit configured to, if the computer operates in the sleep mode and the first determination unit determines that the setting value needs to be immediately changed, control the computer so that the computer returns from the sleep mode and changes the setting value, and if the computer operates in the sleep mode and the first determination unit determines that the setting value does not need to be immediately changed, control the computer so that the computer does not immediately change the setting value and maintains the sleep mode.

The present invention makes it possible to avoid the disappearance of an important setting value even at the occurrence of an unexpected power shutdown of an image forming apparatus, while reducing the frequency of the processing for returning from the sleep mode at rewriting of a setting value.

Further features of the present invention will become apparent from the following description of exemplary embodiments (with reference to the attached drawings).

BRIEF DESCRIPTION OF THE DRAWINGS

FIG. 7 is a diagram showing an example of UI screen settings of the image forming apparatus according to the first embodiment.

FIG. 12 is a flowchart for the image forming apparatus according to the second embodiment.

FIGS. 13A and 13B are flowcharts for the image forming apparatus according to the second embodiment.

FIG. 14 is a diagram showing an example of a software configuration of an image forming apparatus according to a third embodiment.

FIGS. 15A, 15B, and 15C are flowcharts for the image forming apparatus according to the third embodiment.

DESCRIPTION OF THE EMBODIMENTS

The following describes embodiments of the present invention with reference to the drawings.

First Embodiment

System Configuration

Figure 1:
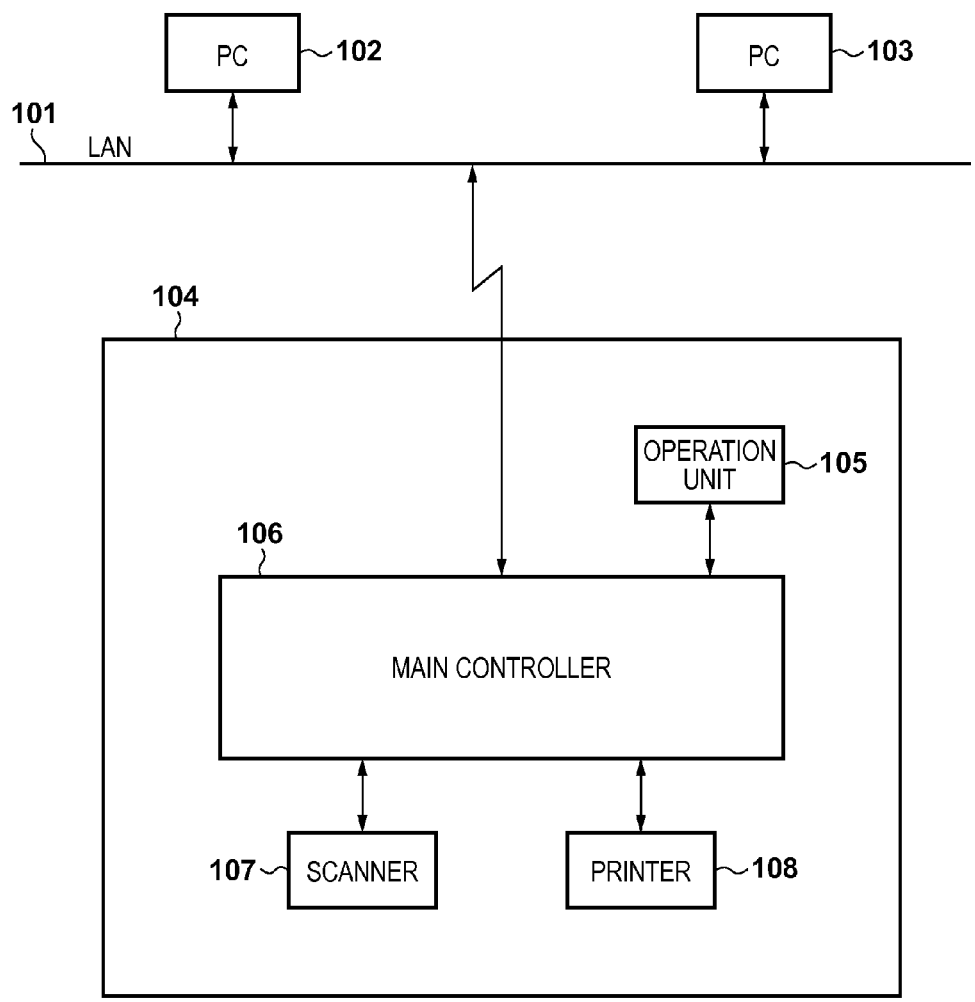
FIG. 1 is a diagram showing an example of a system configuration including an image forming apparatus.

FIG. 1 is a diagram showing an example of a system configuration including an image forming apparatus according to a first embodiment of the present invention and peripheral apparatuses. In this example, an image forming apparatus 104 and PCs 102 and 103 are communicatively connected via a local area network (LAN) 101.

The PC 102 is a general-purpose information processing apparatus, and has a controller including a CPU, a RAM, a ROM, etc., a display apparatus, an input device, and a storage apparatus. The PC 102 starts up a predetermined application and performs various sorts of data processing under the control of a predetermined operating system (OS). Furthermore, it is assumed that for example a driver for outputting data generated by the above-described data processing to the image forming apparatus 104 and a driver for starting up a scanner have been installed in the PC 102 in advance. The PC 102 also has a communication module (not shown) for communicating with devices on a network such as the LAN 101 by using a predetermined protocol (such as TCP/IP, UDP/IP, or IPX). Assume that the PC 103 has substantially the same components as the PC 102 in terms of basic hardware and software configurations.

The image forming apparatus 104 has a main controller 106, an operation unit 105 as a user interface, a scanner 107 as an image input device, and a printer 108 as an image output device. The image forming apparatus 104 also has a unit for communication with the LAN 101, and the image forming apparatus 104 communicates with the PCs 102 and 103 via the LAN 101 by using a predetermined protocol. Examples of the image forming apparatus 104 include, but are not particularly limited to, a multi function peripheral (MFP), a single function printer, and so on.

Configuration of Controller of Image Forming Apparatus

Figure 3:
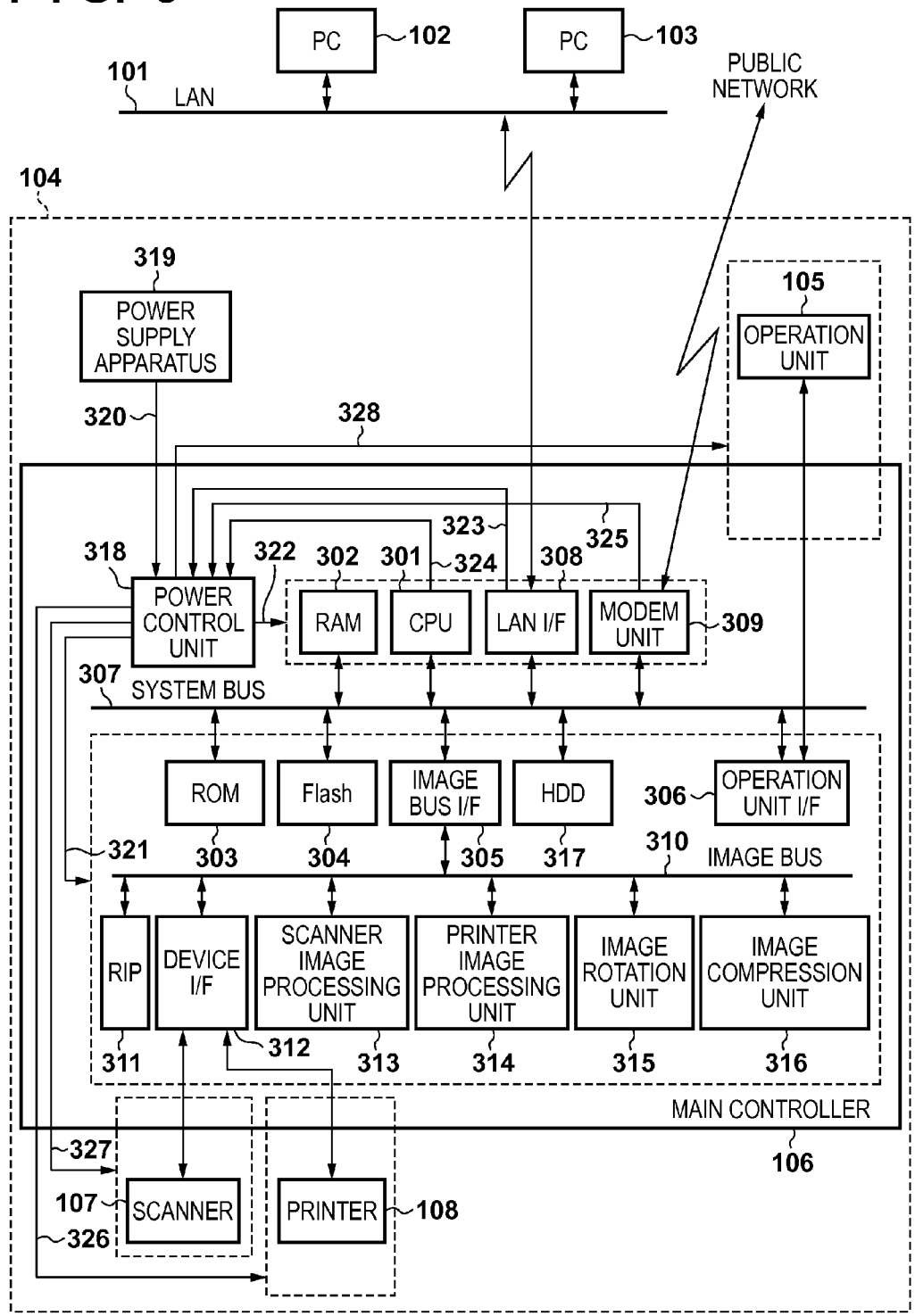
FIG. 3 is a diagram showing an example of a hardware configuration of an image forming apparatus according to a first embodiment.

With reference to FIG. 3, the following describes the configuration of the main controller 106 of the image forming apparatus 104 according to the present invention. The main controller 106 controls the entirety of the image forming apparatus 104, and controls the scanner 107, the printer 108 and so on. Also, the main controller 106 is connected to the LAN 101 and a public network. The main controller 106 performs input/output of image information, the status information of the image forming apparatus 104, files, etc., to/from an external device via the LAN 101 and the public network. The main controller 106 has a central processing unit (CPU) 301 as a main control unit. The CPU 301 is connected to a random access memory (RAM) 302, a read only memory (ROM) 303, and Flash 304 via a system bus 307. The CPU 301 is also connected to an image bus I/F 305, an operation unit I/F 306, a LAN I/F 308, and a modem unit 309. The RAM 302 is a volatile storage unit, and is a memory that is readable/writeable when needed, which provides the CPU 301 with a work area. The RAM 302 is also used as an image memory for temporarily storing image data. The ROM 303 is a non-volatile storage unit, in which a boot program for the system is stored. The Flash 304 is a non-volatile memory and stores system software, setting value data, and so on, which need to be held after the power shutdown of the image forming apparatus 104.

The operation unit I/F 306 is an interface for performing input/output to/from the operation unit 105. The operation unit I/F 306 is used for outputting, to the operation unit 105, image rendering data to be displayed, and transmitting, to the CPU 301, information input by a user via the operation unit 105. The LAN I/F 308 is an interface for connecting to the LAN 101, and performs input/output of information when communicating with an external apparatus via the LAN 101. The modem unit 309 is an interface for connecting to the public network and performing communication, and performs input/output of information to/from the public network. The image bus I/F 305 is an interface for connecting the system bus 307 with an image bus 310 that is for high-speed transfer of image data, and operates as a bus bridge for transforming the structure of data. To the image bus 310, a raster image processor (RIP) 311, a device I/F 312, a scanner image processing unit 313, a printer image processing unit 314, an image rotation unit 315, and an image compression unit 316 are connected. The RIP 311 expands page description language (PDL) data received via the LAN 101, into a bitmap image.

The device I/F 312 is an interface for connecting the scanner 107 and the printer 108 with the main controller 106, and converts image data between a synchronous system and an asynchronous system. The scanner image processing unit 313 performs processing for correction, modification, editing, etc. on input image data read from the scanner 107. The printer image processing unit 314 performs processing for color conversion, filtering, resolution conversion, etc. on printout image data output to the printer 108. The image rotation unit 315 performs rotation of image data. The image compression unit 316 performs JPEG compression and decompression processing on multi-value image data, and performs, for example, JBIG/MMR/MH compression and decompression processing on binary image data. A hard disk drive (HDD) 317 is a non-volatile data storage apparatus, and holds various sorts of data such as image data, address book data, job logs, and individual users' data. Note that the various sorts of data described above are held by the Flash 304 when the main controller 106 has a configuration without a connection with the HDD 317.

The power control unit 318 provides DC power supply (electric power), which is received from a power supply apparatus 319 serving as a power supply unit via a power supply line 320, to predetermined circuit elements of the main controller 106 via power supply lines 321 and 322. The power control unit 318 also supplies power to predetermined circuit elements of the printer 108, the scanner 107, and the operation unit 105, respectively via a power supply line 326, a power supply line 327, and a power supply line 328. In FIG. 3, the dashed lines and solid lines surrounding units connected to the power control unit 318 via the power supply lines 321, 322, 326, 327, and 328 indicate groups for power supply. The power control unit 318 can perform power supply in units of these groups according to each power mode.

The power control unit 318 performs power supply control for each of the power supply lines according to a received control signal. A control signal from the LAN I/F 308 is received via a control signal line 323, a control signal from the modem unit 309 is received via a control signal line 325, and a control signal from the CPU 301 is received via a control signal line 324. The power supply line 321 is connected to the ROM 303, the Flash 304, the image bus I/F 305, the HDD 317, and the operation unit I/F 306. The power supply line 321 is also connected to the RIP 311, the device I/F 312, the scanner image processing unit 313, the printer image processing unit 314, the image rotation unit 315, and the image compression unit 316. The power supply line 322 is connected to the RAM 302, the CPU 301, the LAN I/F 308, and the modem unit 309. The power supply line 326 is connected to the printer 108. The power supply line 327 is connected to the scanner 107. The power supply line 328 is connected to the operation unit 105.

In the image forming apparatus 104 shown in the present embodiment, a mode in which power is supplied only via the power supply line 322 is referred to as first power saving mode, which is a standby mode with the lowest power consumption in the present embodiment. In the following, the first power saving mode is also referred to as first power mode. A mode in which power is supplied to all the units via all the power supply lines is referred to as normal power mode (or a second power mode). The power saving mode is also referred to as sleep mode. Although not shown in the drawings, processing for switching from the normal power mode to the first power saving mode is performed when the CPU 301 of the main controller 106 satisfies the conditions for switching to the sleep mode (e.g., no job has been received or no operation has been made on the operation unit 105 for a predetermined period).

Software Configuration

Figure 4:
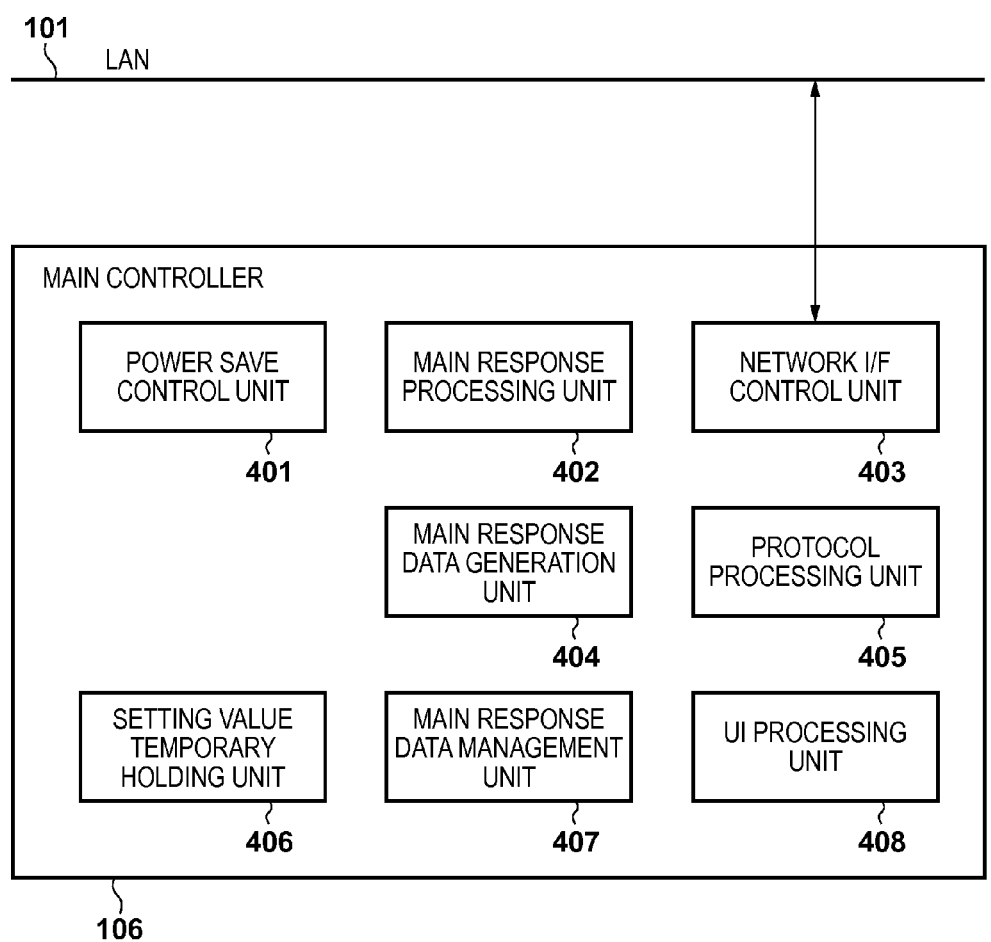
FIG. 4 is a diagram showing an example of a software configuration of the image forming apparatus according to the first embodiment.

FIG. 4 shows functions achieved by software (a program) executed by the main controller 106 embedded in the image forming apparatus 104. The power save control unit 401 performs control for switching between the normal power mode and the first power saving mode. The details of the switching between the power modes will be described later. A network I/F control unit 403 controls transmission and reception of packets by the LAN I/F 308. A protocol processing unit 405 analyzes packets received by the network I/F control unit 403 for each protocol, and generates packets for response. Examples of the protocol include simple network management protocol (SNMP) and service location protocol (SLP). A setting value temporary holding unit 406 performs processing for, when receiving from the PC 102 an instruction to change a setting value of the image forming apparatus 104, temporarily holding within the RAM 302 the data of setting value used for the change.

A UI processing unit 408 is a processing unit used for setting, in advance, the action of the image forming apparatus 104 to be performed in response to a setting change made from the PC 102 when the image forming apparatus 104 is in the sleep mode. The sleep mode will be described later with reference to FIG. 2. A main response processing unit 402 performs response processing at transmission and reception of packet data to/from the PC 102 when the image forming apparatus 104 is in the mode in which power is supplied only to the power supply line 322 in FIG. 3 (i.e. in the first power saving mode). A main response data generation unit 404 generates data used by the main response processing unit 402 to respond to the PC 102 when power is being supplied to the power supply lines 321, 322, 326, 327, and 328 in FIG. 3, and passes the data to a main response data management unit 407. The main response data management unit 407 stores and manages response data in the form of a list on the RAM 302.

Figure 2:
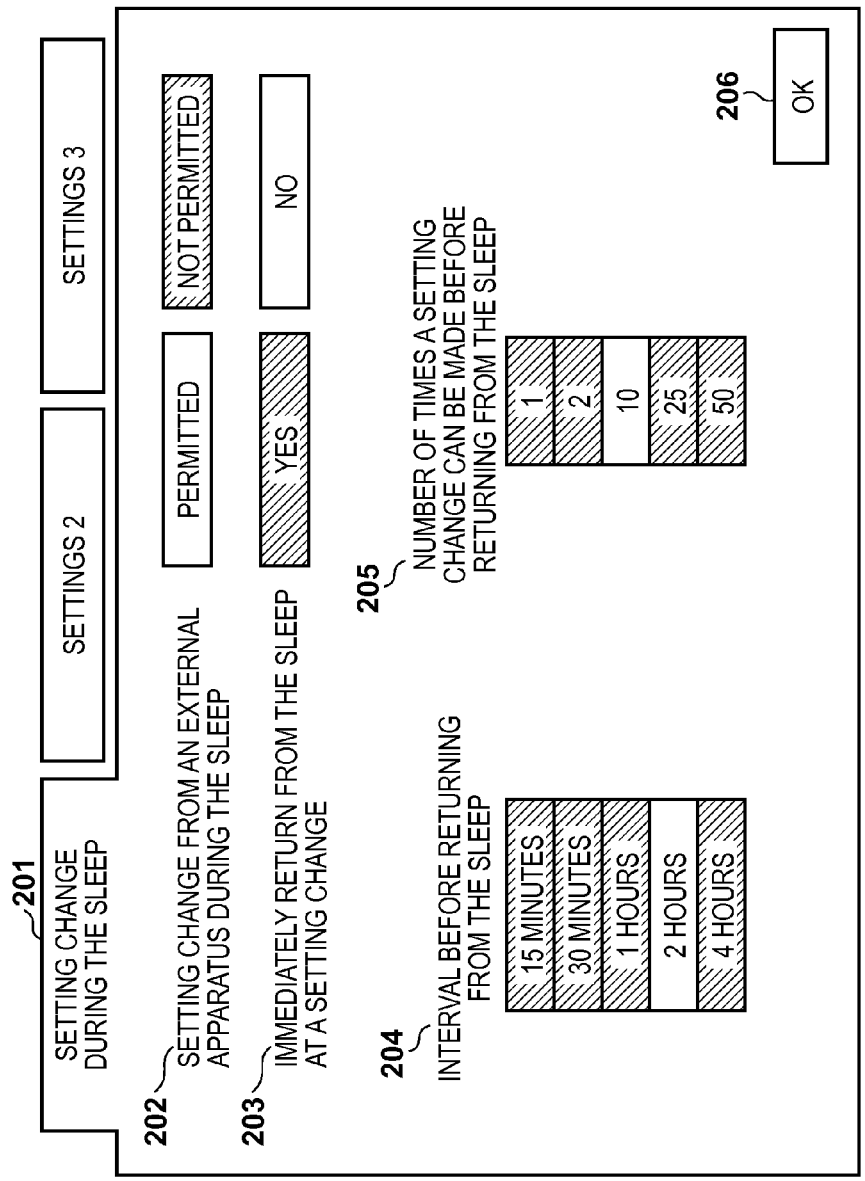
FIG. 2 is a diagram showing an example of UI screen settings.

FIG. 2 is an example of a UI screen as an operation setting screen according to the present embodiment. The effects of the operation settings made on the UI screen shown in FIG. 2 will be described later with reference to FIG. 5 and FIG. 6.

A setting screen 201 is an example of a setting screen used for setting, in advance, the action to be performed in response to an instruction relating to a change of the setting values of the image forming apparatus 104, made from the PC 102 when the image forming apparatus 104 is in the sleep mode. In the present embodiment, the following description is given based on the case of using the operation unit 105 of the image forming apparatus 104. However, instead of the operation unit 105, a web browser (not shown) on the PC 102 may be used for connecting to the remote UI function of the image forming apparatus 104 and making the setting. A setting item 202 is for setting whether to permit or not permit (i.e. prohibit) a setting change made from a remote host such as the PC 102 connected to the network when the image forming apparatus 104 is in the sleep mode. A setting item 203 is for setting whether or not to restart power supply to the power supply lines other than the power supply line 322 in FIG. 3 to allow returning from the sleep mode when the image forming apparatus 104 in the sleep mode accepts a setting change made from the PC 102. This "returning from the sleep mode" indicates a switching from the sleep mode (the first power mode) to the normal power mode (the second power mode).

A setting item 204 is for selecting the length of the interval before returning from the sleep mode occurs and the setting values are reflected in the case where the data of the setting values is stored in the setting value temporary holding unit 406. In other words, this item shows the condition that control for returning to the normal power mode is performed when the period set in this item has elapsed since the beginning of the sleep mode. A setting item 205 is for setting the number of times a setting value change can be made to the setting value temporary holding unit 406 before returning from the sleep mode occurs and the setting values are reflected. Assume that this number of times is the total number of times a setting change instruction can be received in the sleep mode, and the count of the setting changes that has been made is initialized when the settings are reflected. When the contents displayed on the setting screen 201 is acceptable, the user presses an "OK" button 206 and thus the setting ends, and then the operation unit 105 transmits the determined settings to the main controller 106.

Processing Flow

Figure 5:
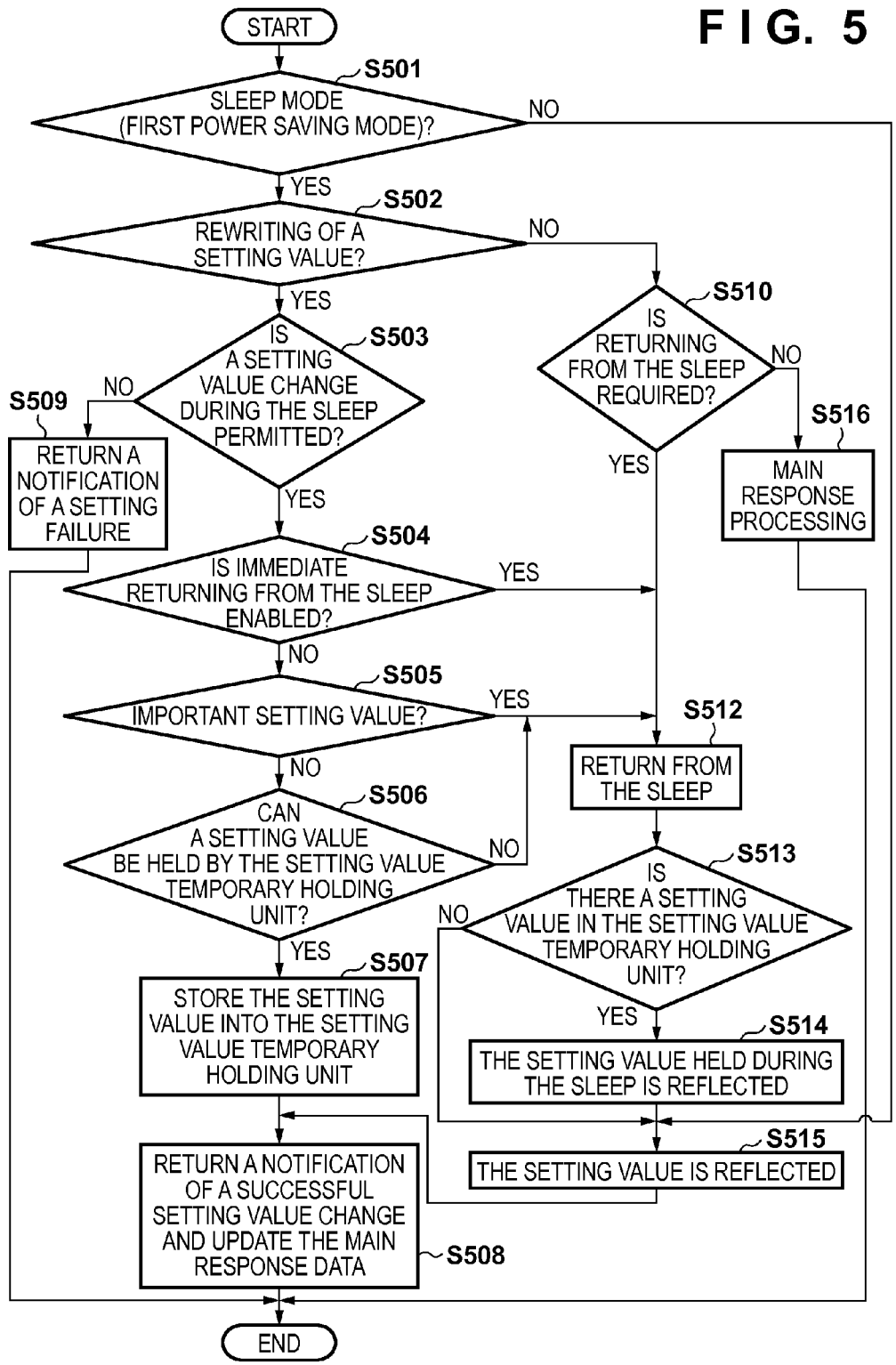
FIG. 5 is a flowchart for the image forming apparatus according to the first embodiment.

Next, with reference to FIG. 5, a description is given to the processing flow of the image forming apparatus 104 according to the settings shown in FIG. 2. This processing flow starts when the image forming apparatus 104 receives a packet from the PC 102.

At step S501, the CPU 301 of the main controller 106 determines whether or not the mode is the sleep mode (the first power saving mode) in which only the power supply line 322 of the power control unit 318 is enabled. When it is determined that a packet was received in the sleep mode (YES at step S501), the processing moves to step S502. On the other hand, when it is determined that the packet was received in a mode other than the sleep mode (i.e., in the normal power mode) (NO at step S501), the CPU 301 performs, at step S515, processing for writing a setting value to one of the non-volatile memory units, namely the Flash 304 or the HDD 317. Then, the processing moves to step S508.

At step S502, the CPU 301 determines whether or not the received data is for rewriting of the setting value (setting change). When the data is for rewriting of the setting value (YES at step S502), the processing moves to step S503, and when the data is not for rewriting of the setting value (NO at step S502), the processing moves to step S510. Note that the received packet data can be classified into data for execution of a print job or a control (e.g. a shutdown instruction from the PC 102), a request from the PC 102 for acquisition of information of the image forming apparatus 104, or the like, in addition to rewriting of the setting value. When the data is for execution of a print job or a control, it is necessary to return from the sleep mode and perform processing. For this reason, the CPU 301 makes a determination at step S510 as to whether the data packet requires returning from the sleep mode, or requires only acquisition of the setting value.

When the packet data requires returning from the sleep mode (YES at step S510), the processing moves to step S512, and when it is determined that the packet data does not require returning from the sleep mode (i.e., requires only acquisition of information) (NO at step S510), the processing moves to step S516. At step S516, the CPU 301 performs response processing while maintaining the sleep mode, by using the main response processing unit 402 and the response data held by the main response data management unit 407 shown in FIG. 4. Then, this processing flow ends.

At step S512, the CPU 301 restarts power supply to the power supply lines other than the power supply line 322 as well, and performs processing for returning from the sleep mode. That is, the mode is switched to the normal power mode. Note that after the processing for returning from the sleep mode at step S512, when the conditions for switching to the sleep mode is satisfied (e.g., when no job has been received or no operation has been made on the operation unit 105 for a predetermined period), the CPU 301 performs processing for switching to the sleep mode again. At step S513, the CPU 301 checks whether or not there is a setting value written in the setting value temporary holding unit 406. When there is a setting value (YES at step S513), the processing moves to step S514, and when there is no setting value (NO at step S513), the processing moves to step S515. Regarding writing of setting values, setting values need to be reflected in the order of being temporarily held during the sleep mode, because whether setting is permitted or not, and the range of setting, may depend on the order of writing in some cases. Therefore, at step S514, the CPU 301 performs processing for causing the setting values in the setting value temporary holding unit 406 to be reflected to the Flash 304 or the HDD 317 in the order from the oldest to the newest.

After all the setting values have been reflected during the sleep mode, the processing by the CPU 301 moves to step S515.

At step S503, the CPU 301 performs determination processing as to whether a setting value change during the sleep mode is permitted or not, based on the setting of the setting item 202 shown in FIG. 2. When a setting value change during the sleep mode is permitted (YES at step S503), the processing moves to step S504, and when it is not permitted (NO at step S503), the processing moves to step S509. When a setting value change during the sleep mode is not permitted, the CPU 301 performs, at step S509, response processing for providing a notification of the setting change failure to the host such as the PC 102 that made the setting change instruction. Since the returning value in the case of a failure of the setting change is different for each protocol, the CPU 301 performs the processing as predetermined processing by the protocol processing unit 405. After the completion of the response processing, this processing flow ends.

At step S504, the CPU 301 performs determination processing as to whether immediate returning from the sleep mode is enabled or not, based on the setting of the setting item 203 shown in FIG. 2. When the immediate returning from the sleep mode at the time of a setting change is enabled (YES at step S504), the processing moves to step S512, and when it is disabled (NO at step S504), the processing moves to step S505. At step S505, the CPU 301 performs determination processing as to whether the setting value related to the rewriting instruction is an important setting value or not. This determination as to whether or not the setting value is important or not is made based on the settings on the UI screen shown in FIG. 7, which will be described later. When the setting value is an important setting value (YES at step S505), the processing moves to step S512, and otherwise (NO at step S505), the processing moves to step S506.

At step S506, the CPU 301 makes a determination as to whether or not the setting value can be temporarily stored in the setting value temporary holding unit 406. The data held by the setting value temporary holding unit 406 is held in the RAM 302 that is supplied with power by the power supply line 322 even during the sleep mode. There is a known hardware configuration for, when the RAM 302 is supplied with power only via the power supply line 322, performing partial energization so as to make only a specific address space available and improving the power performance. Including such a case, there is an upper limit to the amount of data that can be held in the RAM 302. As a result of the determination performed by the CPU 301 at step S506, when the setting value cannot be held (NO at step S506), the processing moves to step S512, and when the setting value can be held (YES at step S506), the processing moves to step S507.

At step S507, the CPU 301 stores the setting value into the setting value temporary holding unit 406. Then, the processing moves to step S508. At step S508, the CPU 301 performs, as processing by the protocol processing unit 405, response processing for providing a notification of the successful setting value change to the PC 102 that made the setting change instruction. While maintaining the sleep mode, the CPU 301 performs, for the main response data management unit 407, processing for updating the data used for response, and then this processing flow ends.

Figure 6:
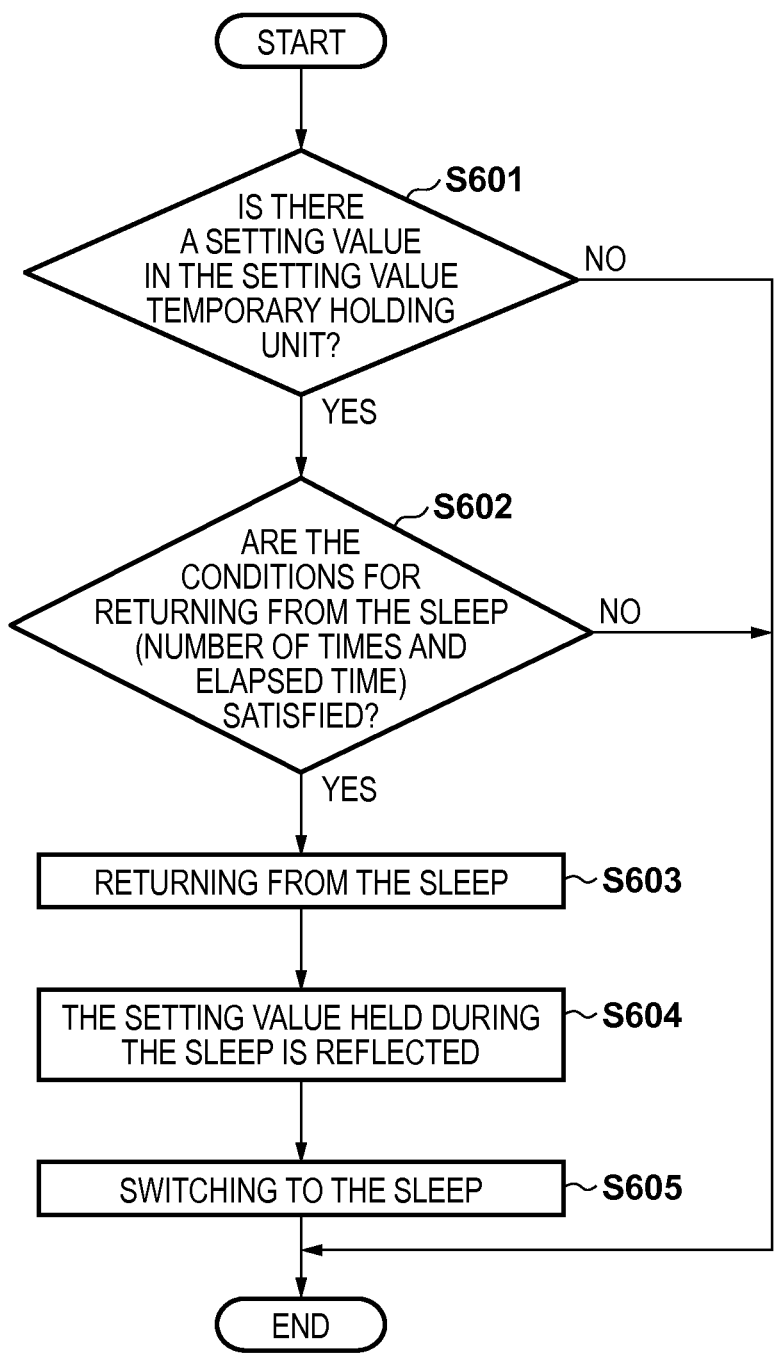
FIG. 6 is a flowchart for the image forming apparatus according to the first embodiment.

Next, with reference to FIG. 6, a description is given to a processing flow of the image forming apparatus 104 according to the settings shown in FIG. 2. The processing shown in FIG. 6 is processing performed when the image forming apparatus 104 is in the sleep mode (i.e., power supply via only the power supply line 322 is performed), and is performed independently from, and not in synchronization with, the receiving of packets from the PC 102 and the processing shown in FIG. 5.

At step S601, the CPU 301 of the main controller 106 checks whether or not a setting value is held by the setting value temporary holding unit 406. When a setting value is not held (NO at step S601), this processing flow ends, and when a setting value is held (YES at step S601), the processing moves to step S602. At step S602, the CPU 301 makes a determination as to whether the setting of the interval before returning to the sleep mode, and the number of setting value changes before returning from the sleep mode, which are set on the setting items 204 and 205 shown in FIG. 2, are satisfied or not. When the conditions are not satisfied (NO at step S602), this processing flow ends, and when the conditions are satisfied (YES at step S602), the processing moves to step S603.

At step S603, the CPU 301 restarts power supply to the power supply line 321 in addition to power supply to the power supply line 322, and performs processing for returning from the sleep mode for the main controller 106. At step S604, the CPU 301 causes the setting value held by the setting value temporary holding unit 406 to be reflected to the Flash 304 or the HDD 317. At step S605, the CPU 301 stops power supply via the power supply line 321, and switches the mode to the sleep mode. Then, this processing flow ends.

FIG. 7 shows an example of a UI screen for setting the importance of the setting value used in the determination processing at step S505 shown in FIG. 5. This setting screen is composed mainly of two screens, and setting of the importance policy is performed on a setting screen 701 and setting for associating the importance with setting items are performed on the setting screen 705. The setting item 702 is for setting, for each group, the policy with respect to the returning from the sleep mode in response to rewriting of a setting value from the host during the sleep mode. The present embodiment defines four groups, and the following groups are shown in the settings 703.

Group A: the setting is reflected upon "immediate return from the sleep"

Group B: the setting is reflected upon "return from the sleep when the setting value has been written 10 times".

Group C: the setting is reflected upon "return from the sleep, occurring two hours after writing".

Group D: writing is not permitted.

The policy that can be set for each group may be selectable from a pull-down menu. When the setting is completed, the user presses an "OK" button 704 and thus the setting ends. Then, the operation unit 105 transmits the determined settings to the main controller 106.

Next, on the setting screen 705, the details of the setting change are associated with the groups. Regarding group A, as an example of items to which the setting values are reflected upon "immediate return from the sleep", setting details 707 show an example where "IP address change" and "user information change" are set. Regarding group B, as an example of items to which the setting values are reflected upon "return from the sleep when the setting value has been written 10 times", setting details 708 show an example where "paper brand information change", "default paper feed cassette change", and "default paper ejection tray change" are set. The paper brand information is basic information of paper other than the paper size, such as the grammage and the color of the paper.

Regarding group C, as an example of items to which the setting values are reflected upon "return from the sleep, occurring two hours after writing", setting details 709 show an example where "snapshot data updating" is set. Snapshot data updating is to update the count information at a given date, and the value of the environment sensor such as the temperature and the humidity around the image forming apparatus 104 at predetermined intervals. Regarding the group D, as an example of items as to which "writing is not permitted", the setting details 710 shows an example where "all the setting items other than the setting items belonging to groups A, B and C" is set.

When the setting is completed, the user presses an "OK" button 711 and thus the setting ends. Then, the operation unit 105 transmits the determined settings to the main controller 106.

As an alternative to the importance setting using the UI shown in FIG. 7, the determination processing at step S505 in FIG. 5, as to whether the setting value is important or not, may be performed by associating the setting value, which the PC 102 has requested the image forming apparatus 104 to rewrite, with information indicating the importance of the setting value. In this case, based on the importance information associated with the setting value, the CPU 301 of the main controller 106 can perform the determination processing at step S505 in an equivalent manner as with the case of using the UI setting shown in FIG. 7, and hence UI registering of the image forming apparatus 104 becomes unnecessary. When such a method is adopted together with the UI setting, priorities may be set separately.

The present embodiment makes it possible to avoid the disappearance of an important setting value even at the occurrence of an unexpected power shutdown of an image forming apparatus, while reducing the frequency of the processing for returning from the sleep mode at rewriting of a setting value.

Second Embodiment

The following describes a second embodiment of the present invention. The main difference from the first embodiment is that the second embodiment has, in addition to the main controller, a sub controller that performs communication control of a network and can operate with power supply from another power supply line.

System Configuration

Figure 8:
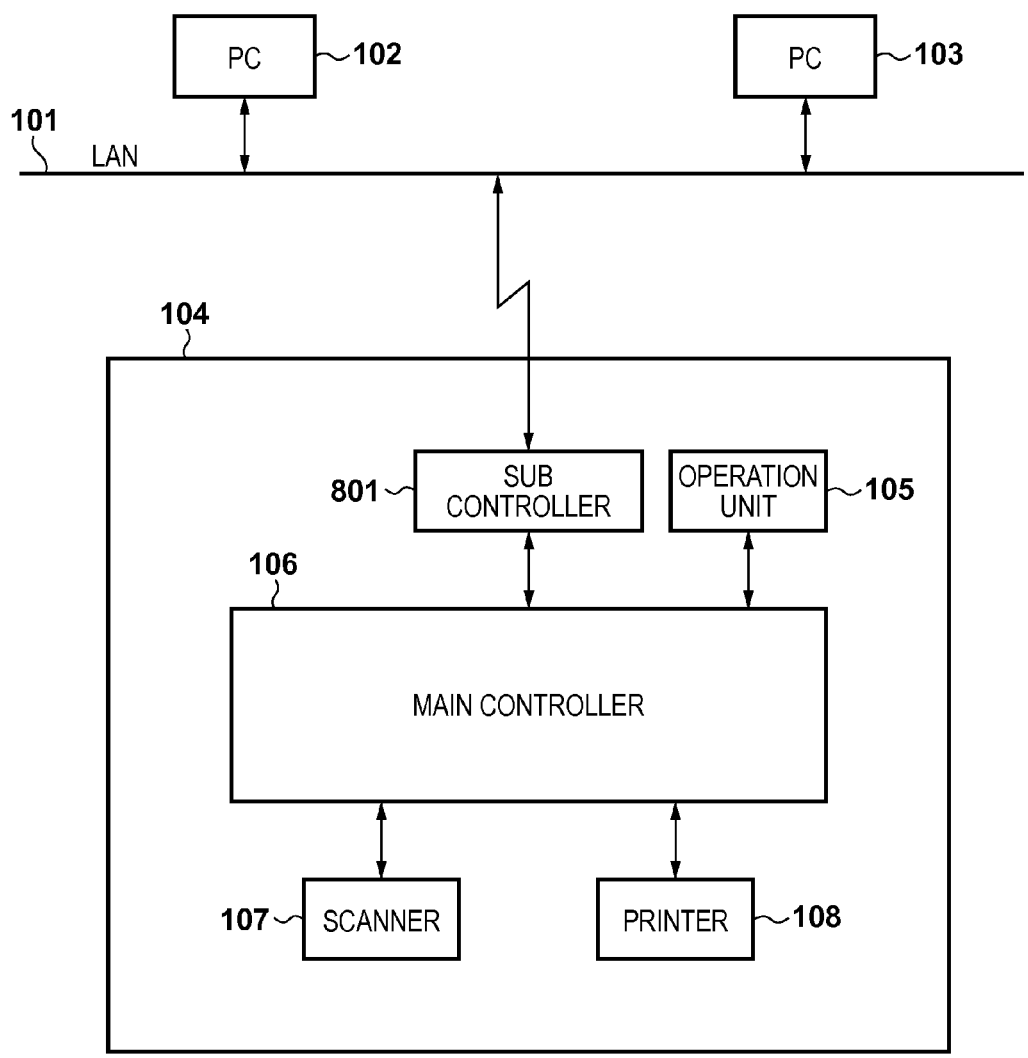
FIG. 8 is a diagram showing an example of a system configuration of an image forming apparatus according to a second embodiment.

FIG. 8 shows an example of a system configuration according to the present embodiment. The difference from FIG. 1 described in the first embodiment is that a sub controller 801 is configured so as to operate with power supply from a power supply line different from the power supply lines connected to the main controller 106, and other aspects of the system configuration are the same.

Configuration of Controller of Image Forming Apparatus

Figure 9:
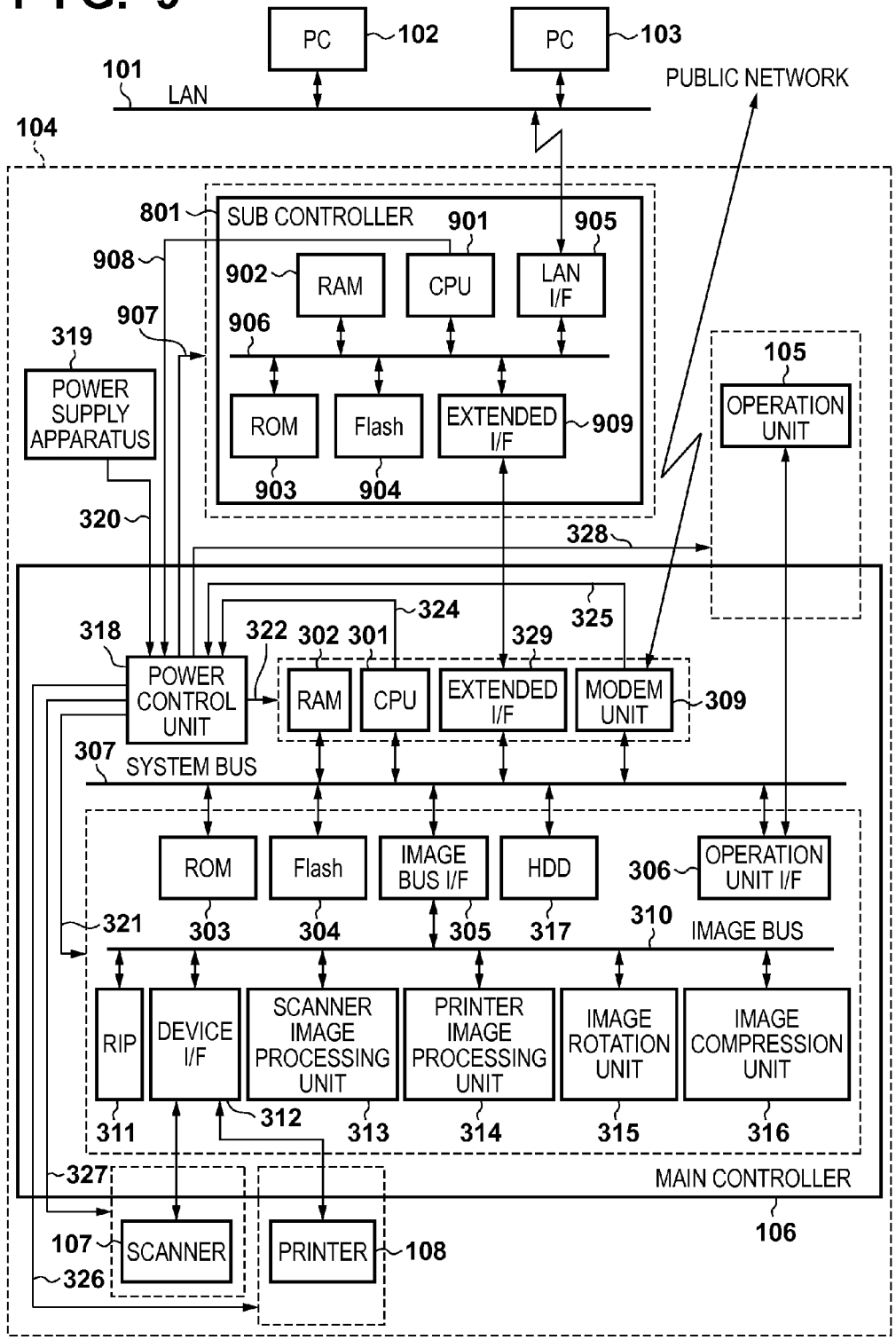
FIG. 9 is a diagram showing an example of a hardware configuration of an image forming apparatus according to the second embodiment.

FIG. 9 shows an example of a hardware configuration of an image forming apparatus according to the present embodiment. The following describes mainly the configuration of the sub controller 801 of the image forming apparatus 104 according to the present embodiment, which is the difference from the first embodiment. The LAN I/F 308 described in the first embodiment with reference to FIG. 3 is excluded from the components of the main controller 106, and exists as one of the components of the sub controller 801. The sub controller 801 can be implemented as a network interface card (NIC) for example.

The sub controller 801 includes a CPU 901 as a control unit. The CPU 901 is connected to a system bus 906, and controls the entirety of the sub controller 801 by executing a software program of the sub controller 801. The RAM 902 is a volatile storage area, and is used for storing temporary data when the CPU 901 controls the apparatus. A ROM 903 is a non-volatile storage area, and is used for storing a boot program of the sub controller 801, fixed parameters, and so on. The RAM 902 also stores pattern data used for classifying packets received via the LAN 101 into "packets to be discarded", "packets to be transferred to the main controller", and "packets to be subjected to proxy response".

An extended I/F 909 is connected to an extended I/F 329 of the main controller 106, and controls data communication between the main controller 106 and the sub controller 801. A LAN I/F 905 is connected to the LAN 101 and performs network communication with the PC 102 and so on. A Flash 904 is configured as a non-volatile memory unit in which setting values, firmware, and so on of the sub controller 801 are rewriteable. Updating of the data within the Flash 904 is performed from the side of the main controller 106 via the extended I/F 909. The CPU 901, the RAM 902, the ROM 903, the Flash 904, the LAN I/F 905, and the extended I/F 909 are connected to the system bus 906. The power control unit 318 is connected to a control signal line 908 in addition to the control signal lines and the power supply lines shown in the first embodiment, and performs power supply control for each of the power supply lines according to a control signal received from the CPU 901 of the sub controller 801 via the control signal line 908. A power supply line 907 is connected to the sub controller 801, and can supply power to the sub controller 801 individually.

In the image forming apparatus 104 shown in the present embodiment, the mode in which power is supplied via only the power supply line 907 is referred to as second power saving mode, which is a standby mode with the lowest power consumption in the present embodiment. For the sake of convenience, the second power saving mode is also referred to as third power mode and is thus distinguished from the other modes (power modes) described in the first embodiment. In the image forming apparatus 104 shown in the present embodiment, the mode in which power is supplied to the power supply line 322 in addition to the power supply line 907 is referred to as third power saving mode. Although not shown in the drawings, processing for switching to the second and third power saving mode is performed when the CPU 301 of the main controller 106 satisfies the conditions for switching to the sleep mode (e.g., no job has been received or no operation has been made on the operation unit 105 for a predetermined period). This third power saving mode is the same as the first power saving mode (the first power mode) described in the first embodiment except for that the sub controller 801 according to the present embodiment is supplied with power.

Software Configuration

Figure 10:
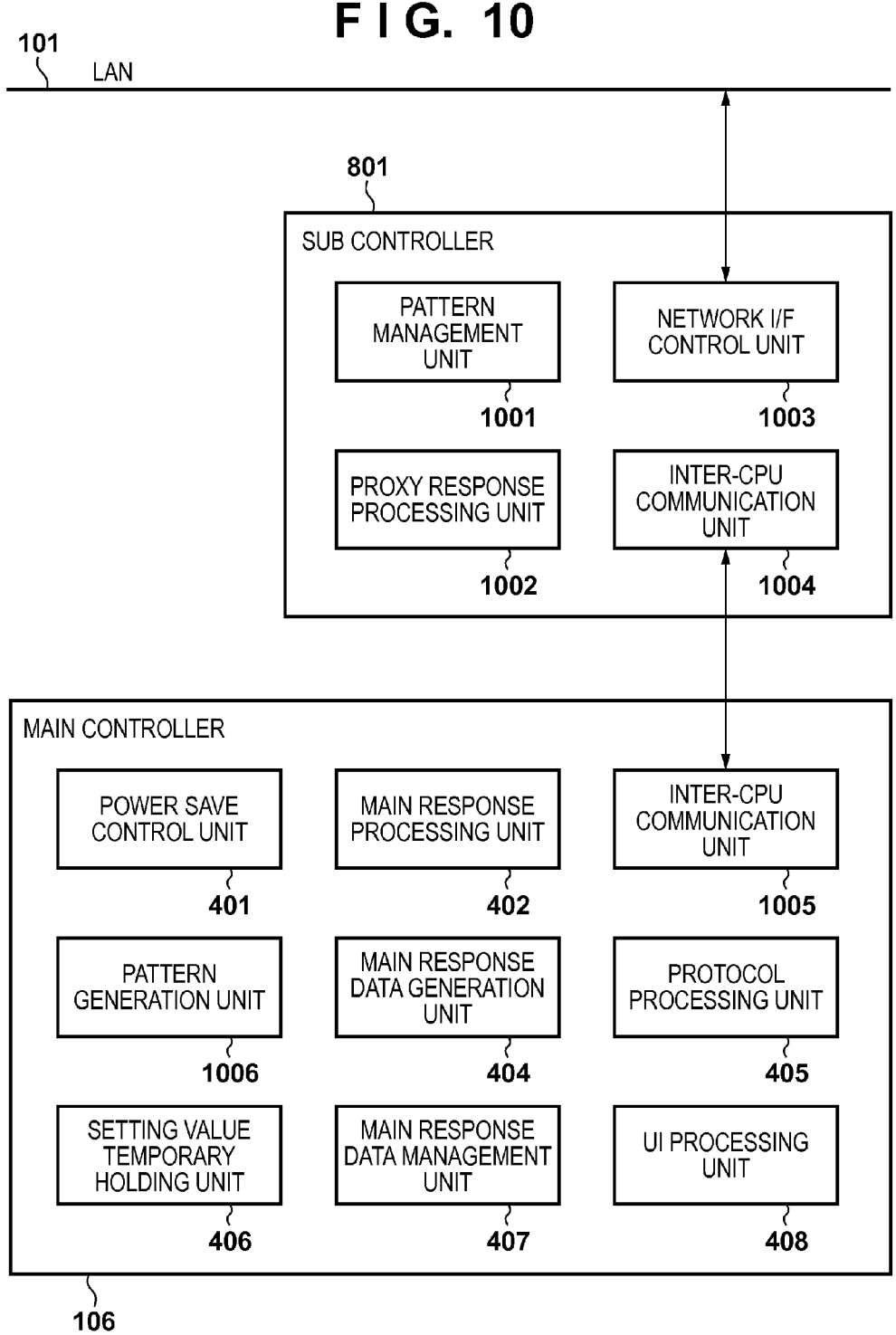
FIG. 10 is a diagram showing an example of a software configuration of the image forming apparatus according to the second embodiment.

FIG. 10 shows functions achieved by software (a program) executed by a controller unit embedded in the image forming apparatus 104. The following describes mainly the difference from FIG. 4 described in the first embodiment.

The sub controller 801 includes a pattern management unit 1001, a proxy response processing unit 1002, a network I/F control unit 1003, and an inter-CPU communication unit 1004. The main controller 106 includes a pattern generation unit 1006 in addition to the configuration of the first embodiment shown in FIG. 4, and an inter-CPU communication unit 1005 instead of the network I/F control unit 403.

The inter-CPU communication unit 1004 of the sub controller 801 and the inter-CPU communication unit 1005 of the main controller 106 perform data transmission and reception between the controllers respectively via the extended I/F 909 and the extended I/F 329. The pattern management unit 1001 manages the packet pattern data generated by the pattern generation unit 1006 of the main controller 106 in the form of a list. The proxy response processing unit 1002 performs response processing by using the pattern data managed by the pattern management unit 1001 when receiving packet data from the network I/F control unit 1003 via a network such as the LAN 101 under the condition where the main controller 106 is not supplied with power. When the proxy response processing unit 1002 cannot perform a response, it provides the power control unit 318 with an instruction to restart power supply to the main controller 106. The proxy response is processing for changing the subject that makes a response to the requestor, according to the power mode and the details of the request, and known technology may be used for this processing. In the present specification, only the points related to the features of the present invention are described.

The network I/F control unit 1003 transfers the received packet to the proxy response processing unit 1002 when power is supplied only to the sub controller 801, and transfers the received packet to the main controller 106 when power is supplied to the main controller 106 as well. The pattern generation unit 1006 generates a packet pattern that enables the image forming apparatus 104 under the condition where only the sub controller 801 is supplied with power to perform a response to an inquiry from the PC 102 for information or the status.

Processing Flow

Initialization Processing

Figure 11:
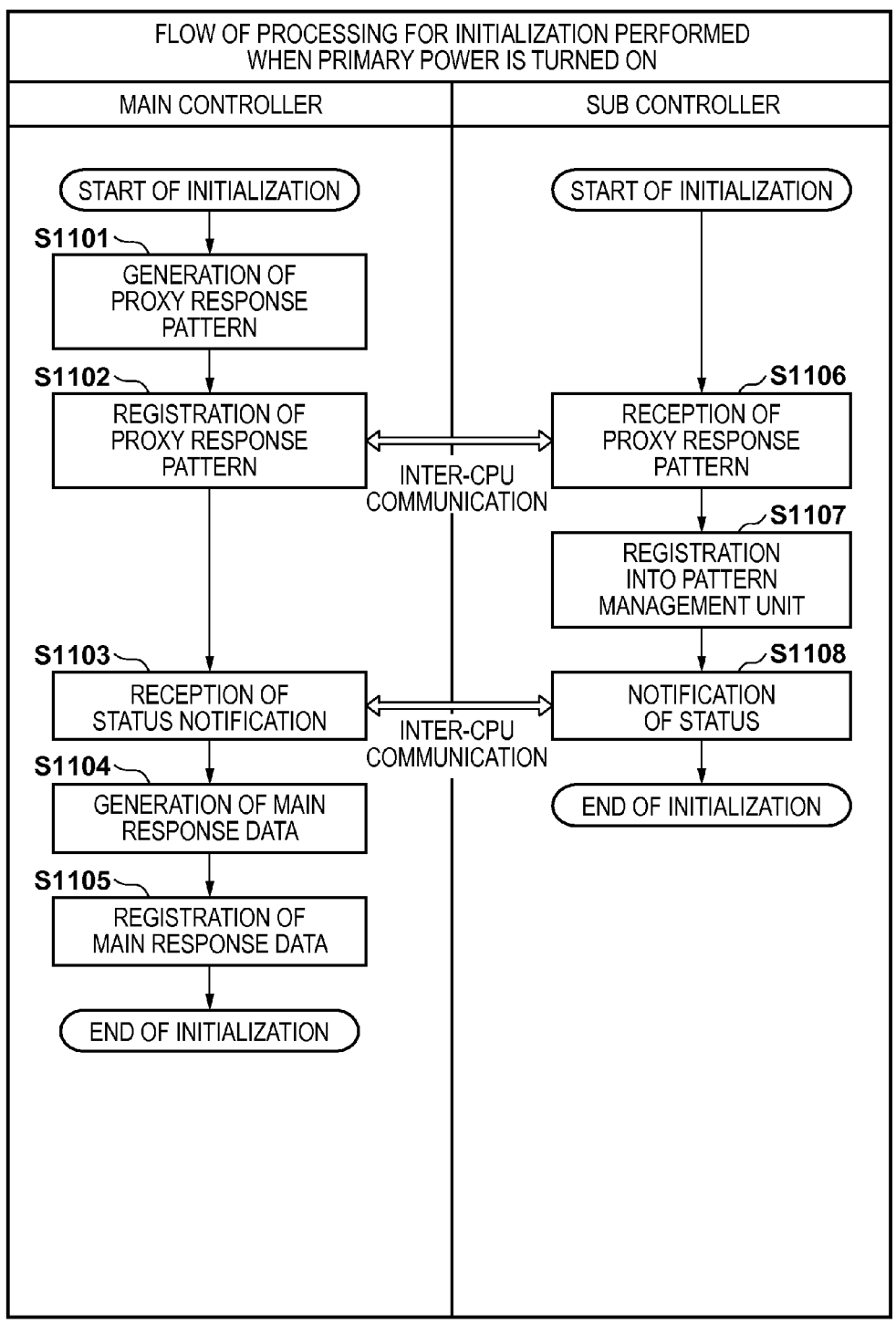
FIG. 11 is a flowchart for the image forming apparatus according to the second embodiment.

With reference to FIG. 11, a description is given to the flow of the processing for initializing the main controller 106 and the sub controller 801 when the primary power of the image forming apparatus 104 is turned ON (i.e., when the image forming apparatus 104 is started up).

When the initialization processing is started, first, on the side of the main controller 106, the CPU 301 generates at step S1101 a proxy response pattern, which is to be registered in the sub controller 801, by using the pattern generation unit 1006. At step S1102, the CPU 301 performs processing for registering the proxy response pattern generated at step S1101 into the sub controller 801 by using the inter-CPU communication unit 1005. At step S1103, the CPU 301 receives a status notification from the sub controller 801, and then the processing moves to step S1104. At step S1104, the CPU 301 performs generation processing by using the main response data generation unit 404. At step S1105, the CPU 301 performs processing for registering the data generated at step S1104 into the main response data management unit 407. Then, this processing flow ends.

Meanwhile, on the side of the sub controller 801, the CPU 901 performs, at step S1106, processing for receiving the proxy response pattern from the main controller 106 via the inter-CPU communication unit 1004. At step S1107, the CPU 901 performs processing for registering the proxy response pattern into the pattern management unit 1001. At step S1108, the CPU 901 notifies the main controller 106 of the status of the sub controller 801 via the inter-CPU communication unit 1004. Then, this processing flow ends.

Processing at Switching to Sleep Mode

With reference to FIG. 12, a description is given to the flow of the processing performed by the main controller 106 and the sub controller 801 when the image forming apparatus 104 switches to the sleep mode. This switching to the sleep mode indicates a switching to the second power saving mode (i.e., only the sub controller 801 is supplied with power).

On the side of the main controller 106, when this processing flow is started, the CPU 301 performs, at step S1201, processing for updating the data used for a main response registered in the main response data management unit 407, by using the main response data generation unit 404. At step S1202, the CPU 301 provides an instruction to switch to the sleep mode (switch to the second power saving mode) to the sub controller 801 via the inter-CPU communication unit 1005. Then, at step S1203, after receiving a status notification from the side of the sub controller 801 indicating that preparations for proxy response have been completed, the CPU 301 provides at step S1204 an instruction to the power control unit 318 to stop power supply to the power supply lines other than the power supply line 907. Then, this processing flow ends.

Meanwhile, on the side of the sub controller 801, the CPU 901 performs, at step S1205, processing for receiving the instruction to switch to the sleep mode (switch to the second power saving mode) from the main controller 106 via the inter-CPU communication unit 1004. Then, the CPU 901 causes the proxy response processing unit 1002 to start the processing thereof. At step S1206, the CPU 901 notifies the main controller 106 via the inter-CPU communication unit 1004 of the completion of the preparations for the proxy response by the sub controller 801. Then, this processing flow ends.

Response Processing During Sleep Mode

Figure 13A:
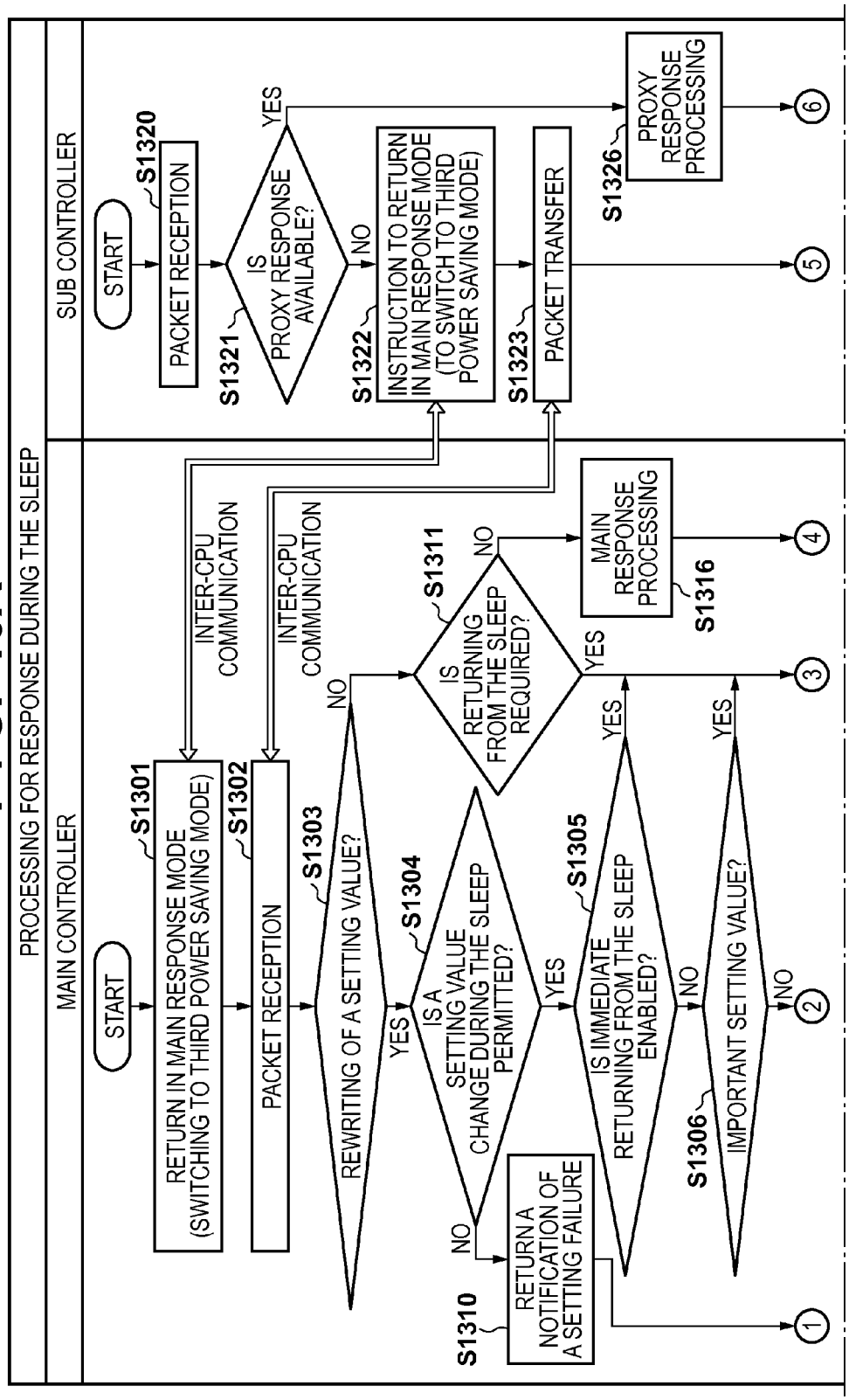

With reference to FIGS. 13A and 13B, a description is given to the flow of the processing performed by the main controller 106 and the sub controller 801 to make a response to a packet received from the PC 102 when the image forming apparatus 104 is in the sleep mode (i.e., in the second power saving mode).

When this processing flow is started, on the side of the sub controller 801, the CPU 901 receives at step S1320 a packet from the PC 102 via the LAN I/F 905. At step S1321, the CPU 901 performs processing for determining whether or not it is possible to respond to the received packet data by proxy response. When it is determined that proxy response to the data can be performed based on the response pattern held by the pattern management unit 1001 (YES at step S1321), the CPU 901 performs at step S1326 the proxy response to the PC 102 by using the proxy response processing unit 1002. Then, this processing flow ends.

When it is determined that the proxy response to the packet data cannot be performed (NO at step S1321), the CPU 901 instructs the power control unit 318 at step S1322 to restart power supply to the power supply line 322 (i.e., to switch to the third power saving mode) via the control signal line 908. Furthermore, the CPU 901 instructs, via the inter-CPU communication unit 1004, the main controller 106 to perform the returning from the sleep mode to the main response mode. Then, at step S1323, the CPU 901 performs data transfer of the packet data received from the PC 102 at step S1320 to the side of the main controller 106 via the inter-CPU communication unit 1004.

At step S1324, after receiving the instruction to switch to the sleep mode (i.e., to switch to the second power saving mode) from the main controller 106 via the inter-CPU communication unit 1004, the CPU 901 causes the proxy response processing unit 1002 to start the processing. At step S1325, the CPU 901 notifies the main controller 106 via the inter-CPU communication unit 1004 of the completion of the preparations for the proxy response by the sub controller 801. Then, this processing flow ends.

Meanwhile, on the side of the main controller 106, the CPU 301 receives at step S1301 the instruction to return from the sleep mode to the main response mode (i.e., instruction to switch to the third power saving mode), from the sub controller 801 via the inter-CPU communication unit 1005, and causes the main response processing unit 402 to restart the processing. At step S1302, the CPU 301 receives, from the sub controller 801 via the inter-CPU communication unit 1005, the packet data to which proxy response could not be performed. At step S1303, the CPU 301 determines whether the received data is for rewriting of the setting value or not. When it is determined that the received data is for rewiring the setting value (YES at step S1303), the processing moves to step S1304, and otherwise (NO at step S1303) the processing moves to step S1311.

Note that the received packet data can be classified into data for execution of a print job or a control (e.g. a shutdown instruction from the PC 102), a request from the PC 102 for acquisition of information of the image forming apparatus 104, or the like, in addition to rewriting of the setting value. When the data is for execution of a print job or a control, it is necessary to return from the sleep mode and perform processing on the side of the main controller 106. For this reason, at step S1311, the CPU 301 determines whether the packet data requires returning from the sleep mode or requires only the acquisition of the setting value. When it is determined that the packet data requires returning from the sleep mode (YES at step S1311), the processing moves to step S1312, and otherwise (i.e., the packet data requires only the acquisition of information) (NO at step S1311), the processing moves to step S1316. At step S1316, the CPU 301 performs the response processing in the third power saving mode by using the main response processing unit 402 and the response data held by the main response data management unit 407. Then, the processing moves to step S1317.

At step S1312, the CPU 301 restarts power supply to the power supply lines other than the power supply line 322 and the power supply line 907 as well, and performs the processing for returning from the sleep mode. That is, the mode is switched to the normal power mode. Note that after the processing for returning from the sleep mode at step S1312, when the conditions for switching to the sleep mode is satisfied (e.g., when no job has been received or no operation has been made on the operation unit 105 for a predetermined period), the CPU 301 performs processing for switching to the sleep mode (the third power saving mode) again.

At step S1313, the CPU 301 checks whether or not there is a setting value written in the setting value temporary holding unit 406. When there is a setting value (YES at step S1313), the processing moves to step S1314, and when there is no setting value (NO at step S1313), the processing moves to step S1315. Regarding writing of setting values, setting values need to be reflected in the order of being temporarily held during the sleep mode, because whether setting is permitted or not, and the range of setting, may depend on the order of writing in some cases. Therefore, at step S1314, the CPU 301 causes the setting values in the setting value temporary holding unit 406 to be reflected to the Flash 304 or the HDD 317 in the order from the oldest to the newest. After all the setting values have been reflected during the sleep mode, the processing by the CPU 301 moves to step S1315.

At step S1304, the CPU 301 performs determination processing as to whether a setting value change is permitted or not, based on the setting of the setting item 202 shown in FIG. 2. When a setting value change by the PC 102 during the sleep mode is permitted (YES at step S1304), the processing moves to step S1305, and when it is not permitted (NO at step S1304), the processing moves to step S1310. When a setting value change during the sleep mode is not permitted (NO at step S1304), the CPU 301 performs, at step S1310, response processing for providing a notification of the setting change failure to the host such as the PC 102 that made the setting change instruction. Since the returning value in the case of a failure of the setting change is different for each protocol, the CPU 301 performs the processing as predetermined processing by the protocol processing unit 405, and then the processing moves to step S1317.

At step S1305, the CPU 301 performs determination processing as to whether immediate returning from the sleep mode is enabled or not, based on the setting of the setting item 203 shown in FIG. 2. When the immediate returning from the sleep mode at the time of a setting change is enabled (YES at step S1305), the processing moves to step S1312, and when it is disabled (NO at step S1305), the processing moves to step S1306. At step S1306, the CPU 301 performs determination processing as to whether or not the setting value related to the rewriting instruction is an important setting value that has been set from the UI shown in FIG. 7. When it is determined that the setting value is an important setting value (YES at step S1306), the processing moves to step S1312, and otherwise (NO at step S1306), the processing moves to step S1307. As an alternative to the importance setting using the UI shown in FIG. 7, the determination processing at step S1306 as to whether the setting value is important or not may be performed by associating the setting value, which the PC 102 has requested the image forming apparatus 104 to rewrite, with information indicating the importance of the setting value. In this case, based on the importance information associated with the setting value, the determination processing at step S1306 can be performed in an equivalent manner as with the case of using the UI setting shown in FIG. 7, and hence UI registering of the image forming apparatus 104 becomes unnecessary. When such a method is adopted together with the UI setting, priorities may be set separately.

At step S1307, the CPU 301 makes a determination as to whether or not the setting value can be temporarily stored in the setting value temporary holding unit 406. The data held by the setting value temporary holding unit 406 is held in the RAM 302 that is supplied with power by the power supply line 322. When the setting value cannot be held (NO at step S1307), the processing moves to step S1312, and when the setting value can be held (YES at step S1307), the processing moves to step S1308. At step S1308, the CPU 301 stores the setting value into the setting value temporary holding unit 406, and then the processing moves to step S1309. At step S1309, the CPU 301 performs, as processing by the protocol processing unit 405, response processing for providing a notification of the successful setting value change to the PC 102 that made the setting change instruction. Also, in the third power saving mode, the CPU 301 performs, for the main response data management unit 407, processing for updating the data used for main response, and then the processing moves to step S1317.

At step S1317, the CPU 301 provides an instruction to switch to the sleep mode (switch to the second power saving mode) to the sub controller 801 via the inter-CPU communication unit 1005. After that, at step S1318, the CPU 301 receives a status notification from the side of the sub controller 801, indicating that preparations for proxy response have been completed. When the preparations for proxy response by the sub controller 801 are completed at step S1318, the CPU 301 provides at step S1319 an instruction to the power control unit 318 to stop power supply to the power supply lines other than the power supply line 907 (switching to the second power saving mode). In this stage, when data is held by the setting value temporary holding unit 406 at step S1308, partial energization is performed so as to make only a specific address space of the RAM 302 available, instead of completely stopping the power supply via the power supply line 322. Then, this processing flow ends.

According to the present embodiment, in the configuration equipped with the sub controller for example, the same effects as the first embodiment can be achieved.

Third Embodiment

The following describes a third embodiment according to the present invention. The main difference from the second embodiment is that the setting value temporary holding unit is configured on the side of the sub controller, not on the side of the main controller. Since the system configuration and the configurations of the controller and so on are the same as in FIG. 8 and FIG. 9 described in the second embodiment, the description thereof are omitted below.

Software Configuration

FIG. 14 shows functions achieved by software (a program) executed by a controller unit embedded in the image forming apparatus 104. The following describes mainly the difference from FIG. 10 described in the second embodiment. In the configuration according to the second embodiment, the setting value temporary holding unit is included in the main controller 106. In the present embodiment, the setting value temporary holding unit, as the setting value temporary holding unit 1401, is provided on the side of the sub controller 801, not on the side of the main controller 106. The setting value temporary holding unit 1401 performs processing for, when an instruction to change a setting value of the image forming apparatus 104 is made from the PC 102, temporarily holding within the RAM 902 the data of setting value used for the changing. The other configurations are the same as in the second embodiment.

Note that the flow of the processing shown in FIG. 11 for initialization when the primary power of the image forming apparatus 104 is turned ON, which is described in the second embodiment, and the flow of processing for switching the mode of the image forming apparatus 104 to the sleep mode, are the same in the present embodiment, and accordingly the description thereof are omitted below.

Processing Flow

Figure 15A:
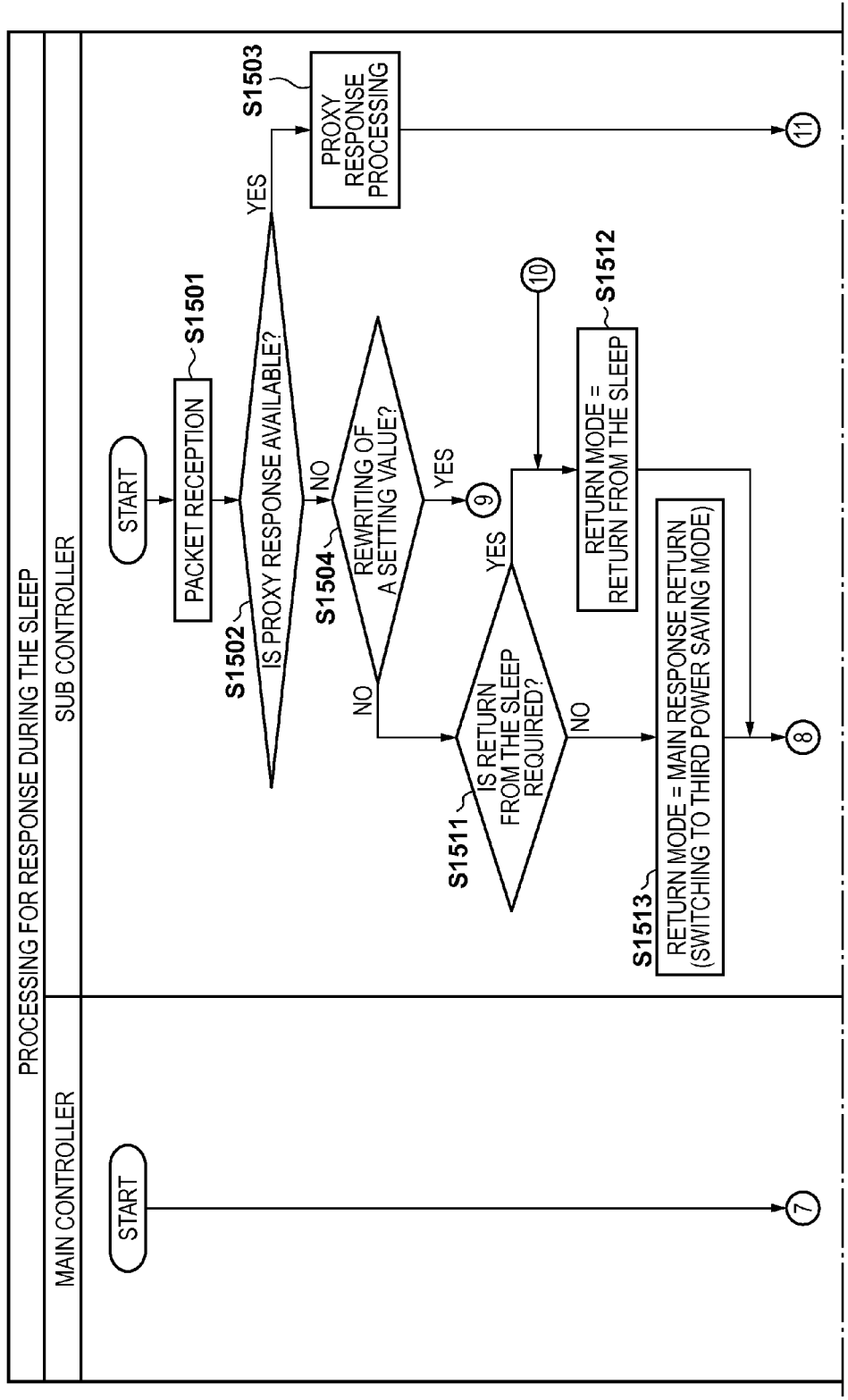

With reference to FIGS. 15A, 15B, and 15C, a description is given to the flow of the processing performed by the main controller 106 and the sub controller 801 to make a response to a packet received from the PC 102 when the image forming apparatus 104 in the sleep mode (i.e., in the second power saving mode).

When the processing is started, on the side of the sub controller 801, the CPU 901 receives at step S1501 a packet from the PC 102 via the LAN I/F 905. At step S1502, the CPU 901 performs processing for determining whether or not it is possible to respond to the received packet data by proxy response. When it is determined that proxy response to the data can be performed based on the response pattern held by the pattern management unit 1001 (YES at step S1502), the CPU 901 performs at step S1503 the proxy response to the PC 102 by using the proxy response processing unit 1002. Then, this processing flow ends.

When it is determined that the proxy response to the packet data cannot be performed (NO at step S1502), the CPU 901 determines at step S1504 whether or not the received data is for rewriting the setting value. When the data is for rewriting of the setting value (YES at step S1504), the processing moves to step S1505, and otherwise (NO at step S1504), the processing moves to step S1511. Note that the received packet data can be classified into data for execution of a print job or a control (e.g. a shutdown instruction from the PC 102), a request from the PC 102 for acquisition of information of the image forming apparatus 104, or the like, in addition to rewriting of the setting value. When the data is for execution of a print job or a control, it is necessary to return from the sleep mode (i.e. to switch to the normal power mode) and perform processing. For this reason, the CPU 901 makes a determination at step S1511 as to whether the data packet requires returning from the sleep mode, or requires only acquisition of the setting value.

When it is determined that the packet data requires returning from the sleep mode (YES at step S1511), the processing moves to step S1512, and otherwise (i.e., the packet data requires only the acquisition of information) (NO at step S1511), the processing moves to step S1513. At step S1512, the CPU 901 determines the return mode to be the mode for returning from the sleep mode (i.e., an instruction to switching to the normal power mode), and at step S1514, performs communication with the CPU 301 of the main controller 106 by using inter-CPU communication. At step S1513, the CPU 901 determines the return mode to be the main response return mode (i.e., an instruction to switching to the third power saving mode), and at step S1514, performs communication with the CPU 301 of the main controller 106 by using inter-CPU communication. Note that before the inter-CPU communication at step S1514, the CPU 901 instructs the power control unit 318 via the control signal line 908 to supply power to the power supply line 322.

At step S1515, the CPU 901 checks whether or not there is a setting value written in the setting value temporary holding unit 1401. When there is a setting value (YES at step S1515), the processing moves to step S1516, and when there is no setting value (NO at step S1515), the processing moves to step S1517. Regarding writing of setting values, setting values need to be reflected in the order of being temporarily held during the sleep mode, because whether setting is permitted or not, and the range of setting, may depend on the order of writing in some cases. Therefore, at step S1516, the CPU 901 transmits the setting values written in the setting value temporary holding unit 1401 to the CPU 301 of the main controller 106 in the order from the oldest to the newest by using inter-CPU transmission. After the inter-CPU communication of the setting values is completed, the processing by the CPU 901 moves to step S1517.

At step S1517, the CPU 901 receives, in addition to the packet received at step S1501, the subsequent packet data from the network I/F control unit 1003. Then, by using the inter-CPU communication, the CPU 901 transfers the packet data to the CPU 301 of the main controller 106. Then, upon completion of the series of processing performed on the side of the main controller 106, the CPU 901, at step S1518, receives the instruction to switch to the sleep mode from the CPU 301 via the inter-CPU communication, and starts the processing for switching to the sleep mode (switching to the second power saving mode). At step S1519, the CPU 901 notifies the CPU 301 via the inter-CPU communication of that the preparations for the proxy response have been completed and the proxy response processing has been started, and then this processing flow ends.

At step S1505, the CPU 901 performs determination processing as to whether a setting value change is permitted or not, based on the setting of the setting item 202 shown in FIG. 2. When a setting value change during the sleep mode is permitted (YES at step S1505), the processing moves to step S1507, and when it is not permitted (NO at step S1505), the processing moves to step S1506. When a setting value change during the sleep mode is not permitted (NO at step S1505), the CPU 901 performs, at step S1506, response processing for providing a notification of the setting change failure to the host such as the PC 102 that made the setting change instruction, and this processing flow ends after the completion of the response processing.

At step S1507, the CPU 901 performs determination processing as to whether immediate returning from the sleep mode is enabled or not, based on the setting of the setting item 203 shown in FIG. 2. When the immediate returning from the sleep mode at the time of a setting change is enabled (YES at step S1507), the processing moves to step S1512, and when it is disabled (NO at step S1507), the processing moves to step S1508. At step S1508, the CPU 901 performs determination processing as to whether or not the setting value related to the rewriting instruction is an important setting value that has been set from the UI shown in FIG. 7. When it is determined that the setting value is an important setting value (YES at step S1508), the processing moves to step S1512, and otherwise (NO at step S1508), the processing moves to step S1509. The processing at step S1508 for determining whether or not the setting value is important is the same as in the second embodiment.

At step S1509, the CPU 901 makes a determination as to whether or not the setting value can be temporarily stored in the setting value temporary holding unit 1401. Since there is an upper limit to the amount of data that can be held by the setting value temporary holding unit 1401, the CPU 901 performs the determination processing, and when the setting value cannot be held (NO at step S1509), the processing moves to step S1512, and when the setting value can be held (YES at step S1509), the processing moves to step S1510. At step S1510, the CPU 901 stores the setting value into the setting value temporary holding unit 1401. Furthermore, the CPU 901 performs response processing for providing a notification of the successful setting value change to the PC 102 that made the setting change instruction. Then, this processing flow ends.

Next, a description is given to the flow of the processing performed on the side of the main controller 106. When the processing is started, at step S1520, the CPU 301 of the main controller 106 receives notification of the return mode for returning from the sleep mode from the CPU 901 of the sub controller 801 via the inter-CPU communication. At step S1521, the CPU 301 uses the control signal line 324 to perform the processing for returning from the sleep mode, and provides an instruction to the power control unit 318 so that power is supplied to the points where need energization. The points to be energized in this stage are determined based on the mode determined at step S1512 or S1513 on the side of the sub controller 801. At step S1521, the CPU 301 receives the setting value held by the setting value temporary holding unit 1401, from the CPU 901 of the sub controller 801 via the inter-CPU communication.

At step S1523, the CPU 301 performs the processing for causing the setting value to be reflected to the Flash 304 or the HDD 317. Regarding the processing in this stage, note that when the return mode is the mode for switching to the third power saving mode (S1513), the setting value is not reflected because the power mode is not the normal power mode, and, for example, the setting value will be held in the RAM 302. Then, when the power mode is switched to the normal power mode, the setting value held in the RAM 302 will be reflected. At step S1524, the CPU 301 performs, for the main response data management unit 407, the processing for updating the data to be used in the main response, and then the processing moves to step S1525. At step S1525, the CPU 301 receives packet data transferred from the CPU 901 of the sub controller 801 via the inter-CPU communication. At step S1526, the CPU 301 performs processing corresponding to the notification of the return mode received at step S1520 and the packet data received at step S1525. For example, in the case of the reception of a print job, the CPU 301 performs printing processing, and in the case of rewriting of the setting value, the CPU 301 performs rewriting processing on the Flash 304 or the HDD 317. Otherwise, the CPU 301 performs, for example, processing for returning the setting information of the image forming apparatus 104 in the third power saving mode to the PC 102.

After the completion of the processing at step S1526, when the conditions for switching to the sleep mode is satisfied, the CPU 301, at step S1527, provides an instruction to switch to the sleep mode (i.e., to switch to the second power saving mode) to the CPU 901 of the sub controller 801 via the inter-CPU communication. At step S1528, the CPU 301 receives the proxy response status on the side of the sub controller 801 via the inter-CPU communication. After that, at step S1529, the CPU 301 provides an instruction to the power control unit 318 to stop power supply via the power supply lines other than the power supply line 907 (i.e., switch to the second power saving mode). Then, this processing flow ends.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-114370, filed Jun. 2, 2014, which is hereby incorporated by reference herein in its entirety.

What is claimed is:

1. An information processing apparatus that is operable in a sleep mode, comprising:
at least one processor coupled to a memory device and programmed to provide:
a first determination unit to which, in a case where data which is received from an external apparatus by the information processing apparatus operating in the sleep mode is setting value change data for requesting to change a setting value of the information processing apparatus, determines whether or not the information processing apparatus needs to return from the sleep mode immediately based on a type of the setting value in which a change is requested; and
a control unit which,
in a case where the first determination unit determines that the information processing apparatus needs to return from the sleep mode immediately, controls the information processing apparatus to return from the sleep mode, and
in a case where the first determination unit determines that the information processing apparatus does not need to return from the sleep mode immediately, controls the information processing apparatus to store the setting value change data in a predetermined storage area without returning from the sleep mode.

2. The information processing apparatus according to claim 1, wherein the processor is further programmed to provide a second determination unit which determines, when the information processing apparatus returns from the sleep mode, whether or not the setting value change data is stored in the predetermined storage area,
wherein, in a case where the second determination unit determines that the setting value change data is stored in the predetermined storage area, the information processing apparatus changes the setting value based on the stored setting value change data.

3. The information processing apparatus according to claim 1,
wherein, even if the first determination unit determines that the information processing apparatus does not need to return from the sleep mode immediately, the control unit controls the information processing apparatus to return from the sleep mode in a case where the setting value change data cannot be stored in the predetermined storage area.

4. The information processing apparatus according to claim 1,
wherein, when a predetermined period has elapsed in storing the setting value change data in the predetermined storage area without returning the information processing apparatus from the sleep mode, the control unit controls the information processing apparatus to return from the sleep mode.

5. The information processing apparatus according to claim 4,
wherein the predetermined period is changeable by a user.

6. The information processing apparatus according to claim 1, wherein, when the setting value change data has been stored in the predetermined storage area a predetermined number of times without returning the information processing apparatus from the sleep mode, the control unit controls the information processing apparatus to return from the sleep mode.

7. The information processing apparatus according to claim 6,
wherein the predetermined number of times is changeable by a user.

8. The information processing apparatus according to claim 1, wherein, in a case where at least the setting value in which a change is requested is an IP (internet protocol) address of the information processing apparatus, the first determination unit determines that the information processing apparatus needs to return from the sleep mode immediately.

9. The information processing apparatus according to claim 8, wherein, in a case where at least the setting value in which a change is requested is a default paper feed cassette, the first determination unit determines that the information processing apparatus does not need to return from the sleep mode immediately.

10. The information processing apparatus according to claim 8, wherein, in a case where at least the setting value in which a change is requested is a default paper ejection tray, the first determination unit determines that the information processing apparatus does not need to return from the sleep mode immediately.

11. The information processing apparatus according to claim 1, wherein the information processing apparatus is a printing apparatus.

12. A method for controlling an information processing apparatus that is operable in a sleep mode, the method comprising:
determining whether or not the information processing apparatus needs to return from the sleep mode immediately based on a type of the setting value in which a change is requested in a case where data which is received from an external apparatus by the information processing apparatus operating in the sleep mode is setting value change data for requesting to change a setting value of the information processing apparatus;
controlling the information processing apparatus to return from the sleep mode in a case where a determination is made in the determining step that the information processing apparatus needs to return from the sleep mode immediately; and
controlling the information processing apparatus to store the setting value change data in a predetermined storage area without returning from the sleep mode in a case where a determination is made in the determining step that the information processing apparatus does not need to return from the sleep mode immediately.

13. A non-transitory computer-readable recording medium storing a program that when executed causes a computer to perform a control method of an information processing apparatus that is operable in a sleep mode, the method comprising:
determining whether or not the information processing apparatus needs to return from the sleep mode immediately based on a type of the setting value in which a change is requested in a case where data which is received from an external apparatus by the computer operating in the sleep mode is setting value change data for requesting to change a setting value of the computer;
controlling the information processing apparatus to return from the sleep mode in a case where a determination is made in the determining step that the computer needs to return from the sleep mode immediately; and
controlling the information processing apparatus to store the setting value change data in a predetermined storage area without returning from the sleep mode in a case where a determination is made in the determining step that the computer does not need to return from the sleep mode immediately.

* * * * *